(12) United States Patent
Cheng et al.

(10) Patent No.: US 10,062,114 B2
(45) Date of Patent: Aug. 28, 2018

(54) MULTI-BROKER ORDER ROUTING BASED ON NET POSITION

(71) Applicant: TRADING TECHNOLOGIES INTERNATIONAL, INC., Chicago, IL (US)

(72) Inventors: Junsheng Cheng, Chicago, IL (US); Stephen P. Decker, Naperville, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

(21) Appl. No.: 14/265,578

(22) Filed: Apr. 30, 2014

(65) Prior Publication Data

US 2014/0379546 A1     Dec. 25, 2014

Related U.S. Application Data

(63) Continuation of application No. 13/961,404, filed on Aug. 7, 2013, now Pat. No. 8,751,370, which is a continuation of application No. 13/269,061, filed on Oct. 7, 2011, now Pat. No. 8,533,104.

(51) Int. Cl.
    *G06Q 40/00*            (2012.01)
    *G06Q 40/04*            (2012.01)

(52) U.S. Cl.
    CPC ................... *G06Q 40/04* (2013.01)

(58) Field of Classification Search
    CPC .............. G06Q 40/04; G06Q 40/06
    See application file for complete search history.

(56) References Cited

U.S. PATENT DOCUMENTS

| | | |
|---|---|---|
| 4,674,044 A | 6/1987 | Kalmus et al. |
| 4,799,156 A | 1/1989 | Shavit et al. |
| 4,980,826 A | 12/1990 | Wagner |
| 5,038,284 A | 8/1991 | Kramer |
| 5,101,353 A | 3/1992 | Lupien et al. |
| 5,297,031 A | 3/1994 | Gutterman et al. |
| 5,453,601 A * | 9/1995 | Rosen ............... G06Q 20/02 235/379 |
| 5,799,287 A | 8/1998 | Dembo |
| 5,963,923 A | 10/1999 | Garber |
| 6,085,176 A | 7/2000 | Woolston |
| 6,131,087 A | 10/2000 | Luke et al. |

(Continued)

FOREIGN PATENT DOCUMENTS

| | | |
|---|---|---|
| JP | 2011-501315 A | 1/2011 |
| WO | 2000/48113 A1 | 8/2000 |

(Continued)

OTHER PUBLICATIONS

"Order Management Systems Drive Growth," Financial News, May 11, 2003, pp. 1-3.

(Continued)

*Primary Examiner* — Bruce I Ebersman
*Assistant Examiner* — Mark H Gaw
(74) *Attorney, Agent, or Firm* — McDonnell Boehnen Hulbert & Berghoff LLP

(57) ABSTRACT

The disclosed embodiments provide tools for multi-broker order routing based on net position at a broker. The net position of a user at a broker to receive a portion of a trade order is considered when allocating the quantity for the trade order to multiple brokers.

12 Claims, 13 Drawing Sheets

(56) References Cited

U.S. PATENT DOCUMENTS

| | | |
|---|---|---|
| 6,278,982 B1 | 8/2001 | Korhammer et al. |
| 6,317,727 B1 | 11/2001 | May |
| 6,408,282 B1 | 6/2002 | Buist |
| 6,505,175 B1 * | 1/2003 | Silverman ............. G06Q 40/00 705/35 |
| 6,519,574 B1 | 2/2003 | Wilton et al. |
| 6,714,889 B2 | 3/2004 | Tezuka et al. |
| 6,772,132 B1 | 8/2004 | Kemp, II et al. |
| 6,829,589 B1 | 12/2004 | Saliba |
| 6,912,511 B1 | 6/2005 | Eliezer et al. |
| 7,003,486 B1 | 2/2006 | Condamoor et al. |
| 7,072,863 B1 | 7/2006 | Phillips et al. |
| 7,127,424 B2 | 10/2006 | Kemp, II et al. |
| 7,146,341 B1 | 12/2006 | Light et al. |
| 7,155,410 B1 | 12/2006 | Woodmansey et al. |
| 7,162,447 B1 | 1/2007 | Cushing |
| 7,177,833 B1 | 2/2007 | Marynowski et al. |
| 7,251,629 B1 | 7/2007 | Marynowski et al. |
| 7,283,980 B2 | 10/2007 | Alaia et al. |
| 7,356,501 B2 | 4/2008 | Churquina |
| 7,376,614 B1 | 5/2008 | Scheinberg et al. |
| 7,386,499 B2 | 6/2008 | Kocher |
| 7,386,503 B2 | 6/2008 | Belyi |
| 7,389,263 B2 | 6/2008 | Gladstone |
| 7,389,268 B1 | 6/2008 | Kemp, II et al. |
| 7,418,420 B2 | 8/2008 | Billings et al. |
| 7,430,532 B2 | 9/2008 | Wizon et al. |
| 7,472,087 B2 | 12/2008 | Keith |
| 7,523,064 B2 | 4/2009 | Burns et al. |
| 7,529,704 B1 | 5/2009 | Breslow et al. |
| 7,539,640 B2 | 5/2009 | Burns et al. |
| 7,555,457 B2 | 6/2009 | Burns et al. |
| 7,565,315 B2 | 7/2009 | West et al. |
| 7,580,882 B2 | 8/2009 | West et al. |
| 7,584,143 B2 | 9/2009 | West et al. |
| 7,587,356 B2 | 9/2009 | West et al. |
| 7,613,650 B2 * | 11/2009 | Smith ................. G06Q 40/04 705/37 |
| 7,620,579 B2 | 11/2009 | West et al. |
| 7,624,069 B2 | 11/2009 | Padgette |
| 7,680,721 B2 | 3/2010 | Cutler |
| 7,693,774 B2 | 4/2010 | Howorka et al. |
| 7,707,098 B2 | 4/2010 | West et al. |
| 7,752,117 B2 | 7/2010 | Burns et al. |
| 7,756,782 B2 | 7/2010 | Monroe et al. |
| 7,774,267 B2 | 8/2010 | Burns et al. |
| 7,801,806 B2 | 9/2010 | Burns et al. |
| 7,809,632 B2 * | 10/2010 | Chiulli ................. G06Q 40/025 705/37 |
| 7,813,997 B2 | 10/2010 | Burns et al. |
| 7,822,672 B2 | 10/2010 | Hausman |
| 7,827,087 B2 | 11/2010 | Adatia |
| 7,908,213 B2 | 3/2011 | Monroe et al. |
| 8,046,283 B2 | 10/2011 | Burns et al. |
| 8,533,104 B2 | 9/2013 | Cheng et al. |
| 2001/0027434 A1 | 10/2001 | Alaia et al. |
| 2001/0042041 A1 | 11/2001 | Moshal et al. |
| 2001/0049650 A1 | 12/2001 | Moshal et al. |
| 2002/0004774 A1 | 1/2002 | Defarlo |
| 2002/0013757 A1 | 1/2002 | Bykowsky et al. |
| 2002/0082852 A1 | 6/2002 | Greene et al. |
| 2002/0091606 A1 * | 7/2002 | Shapiro ................. G06Q 40/04 705/36 R |
| 2002/0091617 A1 | 7/2002 | Keith |
| 2002/0099562 A1 | 7/2002 | Bruce, Sr. et al. |
| 2002/0103742 A1 | 8/2002 | Billings et al. |
| 2002/0107786 A1 | 8/2002 | Lehmann-Haupt et al. |
| 2002/0116205 A1 | 8/2002 | Ankireddipally et al. |
| 2002/0116317 A1 | 8/2002 | May |
| 2002/0128952 A1 | 9/2002 | Melkomian et al. |
| 2002/0133455 A1 | 9/2002 | Howorka et al. |
| 2002/0156716 A1 | 10/2002 | Adatia |
| 2002/0178099 A1 | 11/2002 | Young |
| 2002/0178104 A1 | 11/2002 | Hausman |
| 2002/0188544 A1 | 12/2002 | Wizon et al. |
| 2002/0188549 A1 | 12/2002 | Nordlicht |
| 2003/0009419 A1 | 1/2003 | Chavez et al. |
| 2003/0041006 A1 | 2/2003 | Bunda |
| 2003/0069834 A1 | 4/2003 | Cutler |
| 2003/0126068 A1 | 7/2003 | Hauk et al. |
| 2003/0139989 A1 | 7/2003 | Churquina |
| 2003/0158804 A1 | 8/2003 | Francis et al. |
| 2003/0167146 A1 | 9/2003 | Tezuka et al. |
| 2003/0233325 A1 | 12/2003 | Belyi |
| 2004/0034587 A1 | 2/2004 | Amberson et al. |
| 2004/0153391 A1 | 8/2004 | Burns et al. |
| 2004/0153393 A1 | 8/2004 | West et al. |
| 2004/0172357 A1 | 9/2004 | Padgette |
| 2004/0210504 A1 | 10/2004 | Rutman |
| 2004/0210511 A1 | 10/2004 | Waelbroeck |
| 2005/0027635 A1 | 2/2005 | Monroe et al. |
| 2005/0102217 A1 | 5/2005 | Burns et al. |
| 2006/0015436 A1 | 1/2006 | Burns et al. |
| 2006/0167789 A1 | 6/2006 | Tilly et al. |
| 2006/0195386 A1 | 8/2006 | Glodjo et al. |
| 2006/0259396 A1 | 11/2006 | Burns et al. |
| 2006/0259400 A1 | 11/2006 | Monroe et al. |
| 2006/0259403 A1 | 11/2006 | Monroe et al. |
| 2008/0243700 A1 | 10/2008 | Nangalia et al. |
| 2009/0119201 A1 | 5/2009 | Burns et al. |
| 2009/0228390 A1 | 9/2009 | Burns et al. |
| 2009/0276352 A1 | 11/2009 | West et al. |
| 2009/0276353 A1 | 11/2009 | West et al. |
| 2010/0088212 A1 | 4/2010 | Czupek et al. |
| 2010/0161476 A1 | 6/2010 | West et al. |
| 2010/0161513 A1 | 6/2010 | West et al. |
| 2010/0268637 A1 | 10/2010 | Burns |
| 2010/0280938 A1 | 11/2010 | Burns et al. |
| 2010/0325034 A1 | 12/2010 | Burns et al. |
| 2012/0084195 A1 | 4/2012 | Bauerschmidt et al. |
| 2012/0246052 A1 | 9/2012 | Taylor et al. |
| 2013/0091045 A1 | 4/2013 | Cheng et al. |
| 2013/0325688 A1 | 12/2013 | Cheng et al. |

FOREIGN PATENT DOCUMENTS

| | | |
|---|---|---|
| WO | 2000/65510 A1 | 11/2000 |
| WO | 2009/054979 A2 | 4/2009 |
| WO | 2013/052229 A1 | 4/2013 |

OTHER PUBLICATIONS

TechEncyclopedia—definition of the term "hosting" Webpage [online], The Computer Language Company, TechWeb.com, n.d. [Retrieved on Oct. 26, 2007] from the Internet: http://www.techweb.com/encyclopedia/shared/printArticlePageSrc.jhtml?term=hosting.

Tech Encyclopedia—definition of the terms "hosted environment" Webpage [online], The Computer Language Company, TechWeb.com, n.d. [Retrieved on Oct. 26, 2007] from the Internet: http://www.techweb.com/encyclopedia/shared/printArticlePageSrc.jhtml?term=hosted environment.

"What is hosting?—a definition from Whatis.com" Webpage [online], TechTarget, Sep. 19, 2003. [Retrieved on Oct. 26, 2007] from the Internet: http://searchsoa.techtarget.com/sDefinition/O,,sid26_gci213581,00.html.

Doyle, C., Computer Dictionary, 2nd Edition, Microsoft Press, Redmond, Washington: 1994, p. 201.

Globex Members Handbook, Jun. 1992, DX632, DTX632, eS0069744-eS0069818.

Globex Users Guide, Jan. 1997, DDX 633, DTX 633, Es0069819-eS0070081.

Google Definition Search for Hosting [online], Google, Inc., n.d., [Retrieved on Oct. 26, 2007] from the Internet: http://www.google.com/search?hl=en &safe=off&defl=en&q=define:Hosting&sa=X &oi.

Harvey, C.R., The Free Dictionary—definition of the phase "Intermarket Trading Systems (ITS)" Webpage [online], The Free Dictionary, Farlex, 2004. [Retrieved on Oct. 3, 2006] from the Internet: http://financial-dictionary.thefreedictionary.com/Intermarket+Trading+System.

(56) References Cited

OTHER PUBLICATIONS

International Search Report and Written Opinion of International Application No. PCT/US2004/037215, dated May 19, 2005 (dated Aug. 31, 2005).

International Search Report and Written Opinion of International Application No. PCT/US2012/053926, dated Oct. 18, 2012 (dated Nov. 16, 2012).

International Search Report of International Application No. PCT/US2004/002838, dated May 27, 2005 (dated Aug. 18, 2005).

International Search Report of International Application No. PCT/US2004/002843, dated Feb. 9, 2005 (dated Jan. 17, 2006).

International Search Report of International Application No. PCT/US2004/025543, dated Mar. 7, 2005 (dated Apr. 27, 2005).

Real Tick—Multi-Broking 102 Webpage [online], Townsend Analytics, Ltd., 2009, pp. 1-4. [Retrieved on Oct. 20, 2011] from the Internet: http://www.realtick.com/v2_files/newsletters/mb102.html.

RealTick Matters Newsletter [online], Townsend Analytics, Ltd., Jun. 2009, vol. 1, No. 2, pp. 1-4. [Retrieved on Oct. 20, 2011] from the Internet: http://www.realtick.com/v2_files/newsletters/2009_06_RealTick_Matters.html.

RealTick Matters Newsletter [online], Townsend Analytics, Ltd., Mar. 2009, vol. 1, No. 1, pp. 1-4. [Retrieved on Oct. 20, 2011] from the Internet: http://www.realtick.com/v2_files/newsletters/TOW-2999f01_eNews.html.

Sivy, M., "Forecast 2001" [online], Money, Jan. 2001, vol. 30, Iss. 1, p. 64 (7 pages). [Retrieved on Sep. 9, 2008] from the Internet: http://proquest.umi.com/, ProQuest Document ID: 65315246.

The Complete Globex2 Handbook, Jul. 1998, DX637, DTX637, CME-E014048- CME-E014286.

The Complete Globex2 Handbook, May 1998, DX635, DTX635, CME-E0010679- 0010891.

Transcript of National Press Club Luncheon Speech of Frank Zarb, Ceo, National Association of Securities Dealers National Press Club, Washington, DC, Federal News Service, Jun. 23, 1999, pp. 1-13.

User Guide V4.60 LIFFE Connect for Futures by GL Trade, 06/00/99, DX 605, G 123548-G 123603, DTX 605.

\* cited by examiner

MULTI-BROKER ORDER ROUTING BASED ON NET POSITION

CROSS REFERENCE TO RELATED APPLICATIONS

The present application is a continuation of U.S. patent application Ser. No. 13/961,404 filed Aug. 7, 2013, now U.S. Pat. No. 8,751,370, which is a continuation of U.S. patent application Ser. No. 13/269,061 filed Oct. 7, 2011, now U.S. Pat. No. 8,533,104, the contents of each of which are fully incorporated herein by reference for all purposes.

BACKGROUND

An electronic trading system may include a trading device and an electronic exchange. The trading device may send orders to buy or sell tradeable objects at the exchange. In addition, market data may be sent from the exchange to the trading device.

A trade order may be routed or submitted to a broker. The total quantity of the trade order may be referred to as a total order quantity or a trade order quantity. The trade order quantity is an amount of a tradeable object specified in the trade order. The trade order quantity may be divided and routed to more than one broker and/or account at a particular broker. Upon receiving a trade order, a broker attempts to fill the quantity by submitting a trade order to, for example, an exchange.

BRIEF DESCRIPTION OF THE FIGURES

Certain embodiments are disclosed with reference to the following drawings.

Figure 1:
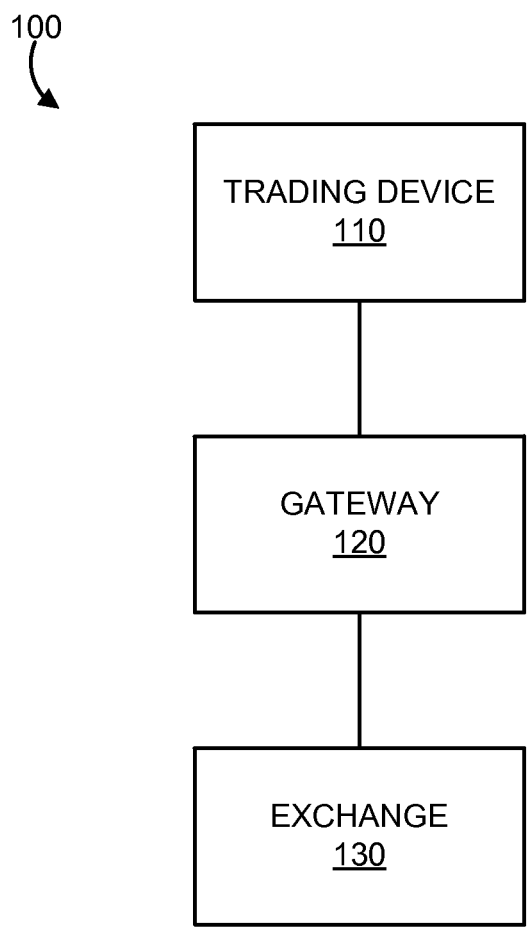
FIG. 1 illustrates a block diagram of an example electronic trading system in which certain embodiments may be employed.

Certain embodiments will be better understood when read in conjunction with the provided drawings, which illustrate examples. It should be understood, however, that the embodiments are not limited to the arrangements and instrumentality shown in the attached drawings.

DETAILED DESCRIPTION

I. Brief Description

The disclosed embodiments provide tools for multi-broker order routing based on net position at a broker. The net position of a user at a broker to receive a portion of a trade order is considered when allocating the quantity for the trade order to multiple brokers.

Multiple brokers may be enlisted to fill a trade order. For example, to fill a trade order of a certain quantity for a certain tradeable object, a first portion of the trade order quantity may be routed to a first broker and a second portion of the trade order quantity may be routed to a second broker. To route the first portion and the second portion of the quantity to the first and second broker, respectively, the initial trade order is split into a first trade order representing the first portion and a second trade order representing the second portion. As discussed herein, this routing of a portion of the trade order quantity to a broker may alternatively be referred to as routing a portion of the trade order to the broker. In addition to routing a trade order to multiple brokers, a trade order may be routed to more than one account at one or more brokers. In this case, each broker-account pairing may be considered as a different "broker" for the purposes of the disclosed tools and, for clarity, the following discussion will only refer to different brokers.

The manner in which portions of a trade order are allocated to brokers is referred to as a routing rule or an allocation rule. An example of a routing rule is a fifty-fifty rule in which fifty percent of a trade order is routed to a first broker and fifty percent of the trade order is routed to a second broker. Another example routing rule is a two-one-one-one (2/1/1/1) rule in which forty percent of a trade order is routed to a first broker and twenty percent of the trade order is routed to each of a second, third, and fourth broker. Another example routing rule is a two-two-one (2/2/1) rule in which forty percent of a trade order is routed to each of a first and second broker and twenty percent of the trade order is routed to a third broker. Another example routing rule is a ninety-ten rule in which ninety percent of a trade order is routed to a first broker and ten percent of the trade order is routed to a second broker.

In some instances, a broker may be unable to fill the entire portion allocated to them. This may be because, for example, the broker is not able to obtain the entire quantity at an acceptable price within a time frame specified with the trade order (such as a Good-Till-Date ("GTD") order). For example, a user utilizing a multi-broker strategy to split a trade order to buy ten contracts among a first broker and a second broker may do so in accordance with a fifty-fifty allocation rule. Thus, in current systems, a buy order for five contracts is routed to the first broker and buy order for five contracts is routed to the second broker. Although the first broker is able to fill the entire quantity of five contracts, suppose the second broker was able to purchase only two contracts (for example, because the trade order was a GTD order for the current day and the second broker was unable to buy the full quantity before the open order quantity was cancelled), leaving three contracts unpurchased. As a result, the user has a first net position (long five) in the contract at the first broker and a second net position (long two) in the contract at the second broker. The user also has an overall net position in the contract across all brokers (long seven). If the user places a second trade order to buy twenty more contracts using the same multi-broker strategy in accordance with the same fifty-fifty allocation rule, in current systems, the second trade order to buy twenty contracts is again split evenly among the first and second brokers, even though the user has a different net position in the contract at each broker. In many instances, this and other conventional multi-broker strategies or rules result in unfavorable distributions of trade orders. For example, it is undesirable for a user to have a flat net position but to actually have a long net position at one broker and a short net position at another broker. As another example, a user may want to be sure that quantity is sent to a particular broker for relationship-related reasons (such as the particular broker provides the trader with good tickets to sporting events).

The embodiments disclosed herein provide tools to enable trading systems, devices, and/or processes to base allocation of a multi-broker trade order on, at least in part, the net position of the user at brokers the trade order may be routed to. In particular, before allocating portions of a trade order for a particular tradable object, certain embodiments disclosed herein consider the net position of the user in the tradeable object at each broker set to receive one of the portions. Based on the net positions of the user at the brokers, distributions of trade order quantity according to an allocation rule can be altered to increase the likelihood that a desired net position of the user at the brokers is achieved. For example, the allocation of trade order quantity to a first broker may be reduced if the current net position of the user at the first broker differs from the current net position of the user at a second broker (whose allocation may be increased) to help the user achieve the desired distribution of their overall net position across the two brokers.

Although the following discloses embodiments including, among other components, software executed on hardware, it should be noted that the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, the disclosed embodiments may be implemented in other ways.

Certain embodiments provide a method including receiving by a computing device a trade order including a trade order quantity of a tradeable object for a user; and allocating by the computing device a first portion of the trade order quantity to a first broker based on a first net position of the user at the first broker related to the tradeable object and a second portion of the trade order quantity to a second broker based on a second net position of the user at the second broker related to the tradeable object.

Certain embodiments provide a computer readable storage medium including instructions that, when executed, cause a computing device to at least receive a trade order including a trade order quantity of a tradeable object for a user; and allocate a first portion of the trade order quantity to a first broker based on a first net position of the user at the first broker related to the tradeable object and a second portion of the trade order quantity to a second broker based on a second net position of the user at the second broker related to the tradeable object.

Certain embodiments provide an apparatus including an interface to receive a trade order including a trade order quantity of a tradeable object for a user; and an allocator to allocate a first portion of the trade order quantity to a first broker based on a first net position of the user at the first broker related to the tradeable object and a second portion of the trade order quantity to a second broker based on a second net position of the user at the second broker related to the tradeable object.

II. Example Electronic Trading System

FIG. 1 illustrates a block diagram of an example electronic trading system 100 in which certain embodiments may be employed. The system 100 includes a trading device 110, a gateway 120, and an electronic exchange 130. The trading device 110 is in communication with the gateway 120. The gateway 120 is in communication with the exchange 130.

As used herein, the phrase "in communication with" may include in direct communication and indirect communication through one or more intermediary components.

In operation, the trading device 110 may send orders to buy or sell tradeable objects at the exchange 130. For example, a user may utilize the trading device 110 to send the orders. The orders are sent through the gateway 120 to the exchange 130. In addition, market data is sent from the exchange 130 through the gateway 120 to the trading device 110. The user may also utilize the trading device 110 to monitor this market data and/or base a decision to send an order for a tradeable object on the market data.

A tradeable object is anything which may be traded with a quantity and/or a price. For example, financial products, including stocks, options, bonds, futures, currency, warrants, funds derivatives, securities, commodities, swaps, interest rate products, index based products, traded events, goods, and collections and/or combinations of these, may be tradeable objects. A tradeable object may be "real" or "synthetic." A real tradeable object includes products that are listed and/or administered by an exchange. A synthetic tradeable object includes products that are defined by the user. For example, a synthetic tradeable object may include a combination of real (or other synthetic) products such as a synthetic spread created by a user utilizing a trading device 110. There may be a real tradeable object that corresponds and/or is similar to a synthetic trading object.

The trading device 110 may include one or more electronic computing platforms such as a hand-held device, laptop, desktop computer, workstation with a single or multi-core processor, server with multiple processors, and/or cluster of computers, for example. For example, while logically represented as a single device, trading device 110 may include a trading terminal in communication with a server, where collectively the trading terminal and the server are the trading device 110. The trading terminal may provide a trading screen to a user and may communicate commands to the server for further processing of the user's inputs through the trading screen, such as placing orders.

The trading device 110 is generally owned, operated, controlled, programmed by, configured by, or otherwise used by a user. As used herein, the phrase "user" may include, but is not limited to, a human (for example, a trader) or an electronic trading device (for example, an algorithmic trading system). One or more users may be involved in the ownership, operation, control, programming, configuration, or other use, for example.

The trading device 110 may include one or more trading applications. The trading application(s) may, for example, process market data by arranging and displaying the market data in trading and charting windows. The market data may be received from exchange 130, for example. As another example, the market data may be received from a simulation environment that provides historical data and/or simulates an exchange but does not effectuate real-world trades. This processing may be based on user preferences, for example. The trading application(s) may include an automated trading tool such as an automated spread trading tool, for example. The one or more trading applications may be distributed across one or more of the computing devices of the trading device 110. For example, certain components of a trading application may be executed on a trading workstation and other components of the trading application may be executed on a server in communication with the workstation.

The trading device 110 may include an electronic trading workstation, a portable trading device, an algorithmic trading system such as a "black box" or "grey box" system, an embedded trading system, and/or an automated trading tool, for example. For example, the trading device 110 may be a computing system running a copy of X_TRADER®, an electronic trading platform provided by Trading Technologies International, Inc. of Chicago, Ill. As another example, the trading device 110 may be a computing device running an automated trading tool such as Autospreader® and/or Autotrader™, also provided by Trading Technologies International, Inc.

As another example, the trading device 110 may include a trading application which algorithmically processes market data and includes a user interface for manual placement of orders based on the algorithmic processing or to manipulate orders that were placed automatically. An algorithmic trading application is a trading application which includes an automatically processed algorithm to perform certain actions. That is, the trading application includes an automated series of instructions to perform defined action(s). The actions may include processing market data in a particular way, placing an order, modifying an existing order, deleting an order, refraining from placing an order, selecting which tradeable object(s) to act on, determining a price to place or modify an order at, determining a quantity to place an order at or modify an order to be, determining whether an order should be to buy or sell, and delaying action for a period of time, for example.

As used herein, an algorithm (also referred to as a trading algorithm) is specified by a definition which includes logic expressions and parameters that describe the algorithm to be used in trading. Logic expressions specify the relationship between parameters and may generate more parameters. Parameters may include, for example, inputs into the logic expressions of the algorithm. The definition of an algorithm may be, at least in part, specified by the algorithmic trading application. For example, an algorithmic trading application may allow a user to only specify parameters to be used by pre-defined logic expressions. As another example, an algorithmic trading application may allow a user to specify some or all of the logic expressions and some or all of the parameters. A trading algorithm where the logic expressions are specified by a user is a user-defined trading algorithm.

Trading applications may be stored in a computer readable medium of the trading device 110. In certain embodiments, one or more components of a trading application may be stored on a trading workstation and other components of the trading application may be stored on a server in communication with the workstation. In certain embodiments, one or more components of a trading application may be loaded into the computer readable medium of the trading device 110 from another computer readable medium. For example, the trading application (or updates to the trading application) may be stored by a manufacturer, developer, or publisher on one or more CDs or DVDs, which are then provided to someone responsible for loading the application onto the trading device 110 or to a server from which the trading device 110 retrieves the trading application. As another example, the trading device 110 may receive the trading application (or updates to the trading application) from a server, for example, via the Internet or an internal network. The trading device 110 may receive the trading application or updates when requested by the trading device 110 ("pull distribution") and/or un-requested by the trading device 110 ("push distribution").

The trading device 110 is adapted to send orders for a tradeable object. The orders may be sent in one or more messages or data packets or through a shared memory system, for example. The trading device 110 may also be adapted to cancel orders, change orders, and/or query an exchange, for example. As another example, the trading device 110 may be adapted to send orders to a simulated exchange in a simulation environment that does not effectuate real-world trades.

The orders sent by the trading device 110 may be sent at the request of a user or automatically, for example. For example, a trader may utilize an electronic trading workstation to place an order for a particular tradeable object, manually providing one or more parameters for the order, such as an order price and/or quantity. As another example, an automated trading tool may calculate one or more parameters for an order and automatically send the order. In some instances, an automated trading tool may prepare the order to be sent but not actually send it without confirmation from the user.

In certain embodiments, the trading device 110 includes a user interface. The user interface may include one or more display devices for presenting a text-based and/or graphical interface of a trading application to a user, for example. For example, the display devices may include computer monitors, hand-held device displays, projectors, and/or televisions. The user interface may be used to specify or review parameters for an order using a trading application. The user interface may include one or more input devices for receiving input, for example. For example, the input devices may include a keyboard, trackball, two or three-button mouse, and/or touch screen. The user interface may include other devices for interacting with a user. For example, information may be audibly provided to a user through a speaker and/or received through a microphone.

In certain embodiments, a trading application includes one or more trading screens to enable a user to interact with one or more markets. Trading screens may enable users to obtain and view market information, set order entry parameters, enter and cancel orders, and/or monitor positions while implementing various trading strategies, for example. For example, a trading application may receive information (such as bid prices, bid quantities, ask prices, ask quantities, prices and quantities for past sales, and/or other market related information) from exchange 130, some or all of which, in turn, may be displayed with a user interface of trading device 110. Based on the received information, the trading screen may display a range of price levels and corresponding bid and ask quantities for the price levels in regard to tradeable objects. In order to provide the user with pertinent trading information, the trading screen may display a range of prices (and the corresponding bid and ask quantities) around the inside market. The information may be continuously or regularly provided to the trading application, which allows the trading application to update the trading screen with current market information. A user may use the trading screen to place buy and sell orders for tradeable objects or to otherwise trade the tradeable objects based on the displayed information, for example.

Trading screens may display one or more trading tools. Trading tools are electronic tools that allow, assist with, and/or facilitate electronic trading. Exemplary trading tools include, but are not be limited to, charts, trading ladders, order entry tools, automated trading tools, automated spreading tools, risk management tools, order parameter tools, order entry systems, market grids, fill windows, and market order windows, combinations thereof, other electronic tools used for trading, preparing to trade, managing trades, or analyzing the market.

In certain embodiments, the orders from the trading device 110 are sent to the exchange 130 through the gateway 120. The trading device 110 may communicate with the gateway 120 using a local area network, a wide area network, a wireless network, a virtual private network, a T1 line, a T3 line, an integrated services digital network ("ISDN") line, a point-of-presence, the Internet, and/or a shared memory system, for example.

The gateway 120 is adapted to communicate with the trading device 110 and the exchange 130. The gateway 120 facilitates communication between the trading device 110 and the exchange 130. For example, the gateway 120 may receive orders from the trading device 110 and transmit the orders to the exchange 130. As another example, the gateway 120 may receive market data from the exchange 130 and transmit the market data to the trading device 110.

In certain embodiments, the gateway 120 performs processing on data communicated between the trading device 110 and the exchange 130. For example, the gateway 120 may process an order received from the trading device 110 into a data format understood by the exchange 130. Similarly, the gateway 120 may transform market data in an exchange-specific format received from the exchange 130 into a format understood by the trading device 110. The processing of the gateway 120 may also include tracking orders from the trading device 110 and updating the status of the order based on fill confirmations received from the exchange 130, for example. As another example, the gateway 120 may coalesce market data from the exchange 130 and provide it to the trading device 110.

In certain embodiments, the gateway 120 provides services other than processing data communicated between the trading device 110 and the exchange 130. For example, the gateway 120 may provide risk processing.

The gateway 120 may include one or more electronic computing platforms such as a hand-held device, laptop, desktop computer, workstation with a single or multi-core processor, server with multiple processors, and/or cluster of computers, for example.

The gateway 120 may include one or more gateway applications. The gateway application(s) may, for example, handle order processing and market data processing. This processing may be based on user preferences, for example.

In certain embodiments, the gateway 120 communicates with the exchange 130 using a local area network, a wide area network, a virtual private network, a T1 line, a T3 line, an ISDN line, a point-of-presence, the Internet, and/or a shared memory system, for example.

In general, the exchange 130 may be owned, operated, controlled, or used by an exchange entity. Example exchange entities include the CME Group, the London International Financial Futures and Options Exchange ("LIFFE"), the IntercontinentalExchange ("ICE"), and Eurex. The exchange 130 may include an electronic matching system, such as a computer, server, or other computing device, that is adapted to allow tradeable objects, for example, offered for trading by the exchange, to be bought and sold. The electronic matching system may include a matching engine, for example. The exchange 130 may include separate entities, some which list and/or administer tradeable objects and others which receive and match orders, for example. The exchange 130 may include an electronic communication network ("ECN"), for example.

The exchange 130 is adapted to match orders to buy and sell tradeable objects. The tradeable objects may be listed for trading by the exchange 130. The orders may include orders received from the trading device 110, for example. Orders may be received from the trading device 110 through the gateway 120, for example. In addition, the orders may be received from other devices in communication with the exchange 130. That is, typically the exchange 130 will be in communication with a variety of other trading devices (which may be similar to trading device 110) that also provide orders to be matched.

The exchange 130 is adapted to provide market data. The market data may be provided in one or more messages or data packets or through a shared memory system, for example. The market data may be provided to the trading device 110, for example. The market data may be provided to the trading device 110 through the gateway 120, for example. The market data may include data that represents the inside market, for example. The inside market is the lowest sell price (also referred to as the "best ask") and the highest buy price (also referred to as the "best bid") at a particular point in time (since the inside market may vary over time). The market data may also include market depth. Market depth refers to the quantities available at the inside market and may also refer to quantities available at other prices away from the inside market. Thus, the inside market may be considered the first level of market depth. One tick away from the inside market may be considered the second level of market depth, for example. In certain embodiments, market depth is provided for all price levels. In certain embodiments, market depth is provided for less than all price levels. For example, market depth may be provided only for the first five price levels on both sides of the inside market. As another example, market depth may be provided for the first ten price levels at which quantity is available in the market. The market data may also include information such as the last traded price (LTP), the last traded quantity (LTQ), and order fill information.

In certain embodiments, the system 100 includes more than one trading device 110. For example, multiple trading devices similar to the trading device 110, discussed above, may be in communication with the gateway 120 to send orders to the exchange 130.

In certain embodiments, the system 100 includes more than one gateway 120. For example, multiple gateways similar to the gateway 120, discussed above, may be in communication with the trading device 110 and the exchange 130. Such an arrangement may be used to provide redundancy should one gateway 120 fail, for example.

In certain embodiments, the system 100 includes more than one exchange 130. For example, the gateway 120 may be in communication with multiple exchanges similar to the exchange 130, discussed above. Such an arrangement may allow the trading device 110 to trade at more than one exchange through the gateway 120, for example.

In certain embodiments, the system 100 includes more than one exchange 130 and more than one gateway 120. For example, multiple gateways similar to the gateway 120, discussed above, may be in communication with multiple exchanges similar to the exchange 130, discussed above. Each gateway may be in communication with one or more different exchanges, for example. Such an arrangement may allow one or more trading devices 110 to trade at more than one exchange (and/or provide redundant connections to multiple exchanges), for example.

In certain embodiments, the trading device 110 includes one or more computing devices or processing components. In other words, the functionality of the trading device 110 may be performed by more than one computing device. For example, one computing device may generate orders to be sent to the exchange 130 while another computing device may provide a graphical user interface to a user. In certain embodiments, the gateway 120 includes one or more computing devices or processing components. In other words, the functionality of the gateway 120 may be performed by more than one computing device. In certain embodiments, the exchange 130 includes one or more computing devices or processing components. In other words, the functionality of the exchange 130 may be performed by more than one computing device.

In certain embodiments, the gateway 120 is part of the trading device 110. For example, the components of the gateway 120 may be part of the same computing platform as the trading device 110. As another example, the functionality of the gateway 120 may be performed by components of the trading device 110. In certain embodiments, the gateway 120 is not present. Such an arrangement may occur when the trading device 110 does not need to utilize the gateway 120 to communicate with the exchange 130, for example. For example, if the trading device 110 has been adapted to communicate directly with the exchange 130.

In certain embodiments, the gateway 120 is physically located at the same site as the trading device 110. In certain embodiments, the gateway 120 is physically located at the same site as the exchange 130. In certain embodiments, the trading device 110 is physically located at the same site as the exchange 130. In certain embodiments, the gateway 120 is physically located at a site separate from both the trading device 110 and the exchange 130.

In certain embodiments, the system 100 may include other devices that are specific to the communications architecture such as middleware, firewalls, hubs, switches, routers, exchange-specific communication equipment, modems, security managers, and/or encryption/decryption devices.

III. Example Computing Device

Figure 2:
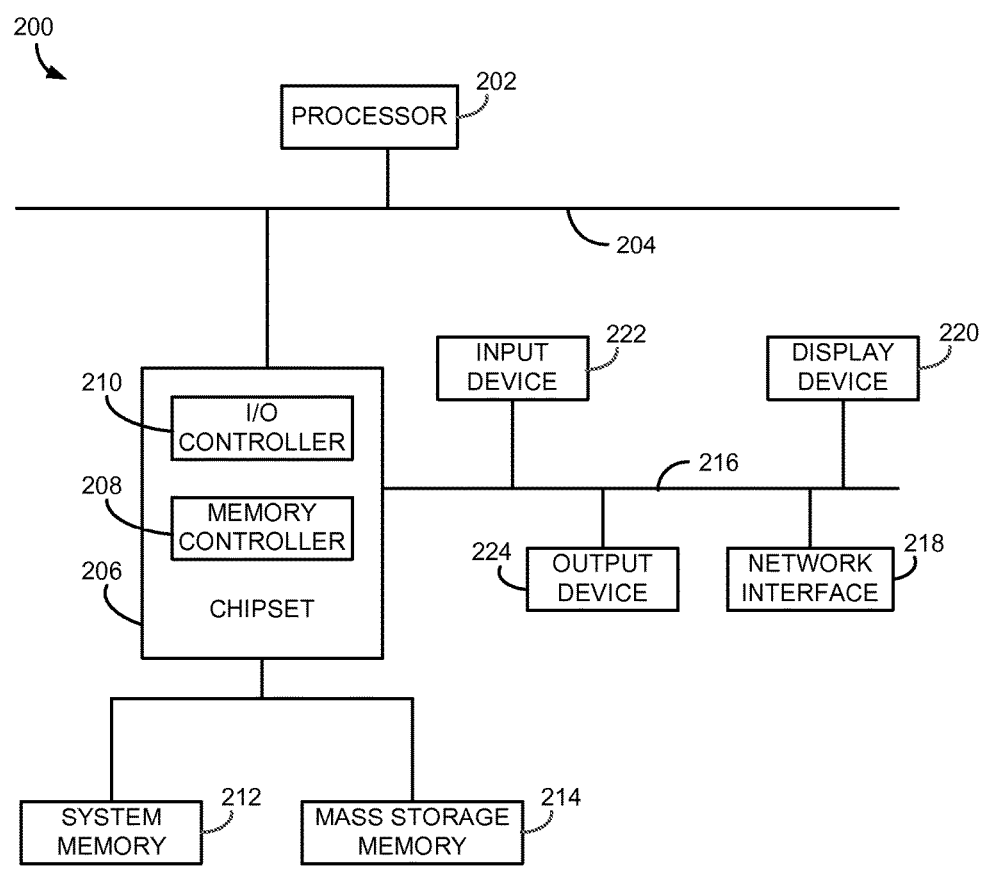
FIG. 2 illustrates a block diagram of an example computing device that may be used to implement the disclosed embodiments.

FIG. 2 illustrates a block diagram of an example computing device 200 that may be used to implement the disclosed embodiments. The trading device 110 of FIG. 1 may include one or more computing devices 200, for example. The gateway 120 of FIG. 1 may include one or more computing devices 200, for example. The exchange 130 of FIG. 1 may include one or more computing devices 200, for example.

The computing device 200 includes a processor 202, an interconnection bus 204, a chipset 206, a memory controller 208, an input/out (I/O) controller 210, a system memory 212, a mass storage memory 214, an I/O bus 216, a network interface 218, a display 220, an input device 222, and an output device 224. The computing device 200 may include additional, different, or fewer components. For example, multiple buses, multiple processors, multiple memory devices, multiple network interfaces, multiple display devices, multiple input devices, multiple output devices, or any combination thereof, may be provided. As another example, the computing device 200 may not include an output device 224 separate from the display device 220. As another example, the computing device 200 may not include a display device 220. As another example, the computing device 200 may not include an input device 222. Instead, for example, the computing device 200 may be controlled by an external or remote input device via the network interface 218.

The computing device 200 includes a processor 202 that is coupled to an interconnection bus 204. The interconnection bus 204 may include a communication bus, channel, network, circuit, switch, fabric, or other mechanism for communicating data between components in the computing device 200. The interconnection bus 204 may be communicatively coupled with and transfer data between any of the components of the computing device 200. For example, during an installation process of a trading application, one or more computer-readable instructions that are to be executed by the processor 202 may be transferred from the input device 222 and/or the network interface 218 to the system memory 212 and/or the mass storage memory 214. When the computing device 200 is running or preparing to run the trading application stored in the system memory 212 and/or the mass storage memory 214, the processor 202 may retrieve the instructions from the system memory 212 and/or the mass storage memory 214 via the interconnection bus 204.

The processor 202 may be a processor, processing unit, or microprocessor, for example. The processor 202 may include one or more general processors, digital signal processors, application specific integrated circuits, field programmable gate arrays, analog circuits, digital circuits, programmed processors, and/or combinations thereof, for example. The processor 202 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. The computing device 200 may be a multi-processor system and, thus, may include one or more additional processors that are communicatively coupled to the interconnection bus 204.

The processor 202 may be operable to execute logic encoded in one or more tangible media, such as the system memory 212, the mass storage memory 214, and/or via the network interface 218. As used herein, logic encoded in one or more tangible media includes instructions that are executable by the processor 202 or a different processor. The logic may be stored as part of software, hardware, integrated circuits, firmware, and/or micro-code, for example. The logic may be received from an external communication device via a communication network, for example, connected to the Internet. The processor 202 may execute the logic to perform the functions, acts, or tasks illustrated in the figures or described herein.

The processor 202 of FIG. 2 is coupled to the chipset 206, which includes the memory controller 208 and the I/O controller 210. A chipset typically provides I/O and memory management functions as well as a plurality of general purpose and/or special purpose registers and timers that are accessible or used by one or more processors coupled to the chipset 206. The memory controller 208 performs functions that enable the processor 202 (or processors if there are multiple processors) to access the system memory 212 and the mass storage memory 214.

The system memory 212 and the mass storage memory 214 may be one or more tangible media, such as computer readable storage media, for example. The system memory 212 may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, any other tangible data storage device, any combination thereof. The mass storage memory 214 may include various types of mass storage devices including, for example, a hard disk drive, optical media, magnetic tape, any other tangible data storage device, or any combination thereof. In certain embodiments, the system memory 212 and the mass storage memory 214 are non-transitory.

The system memory 212 and the mass storage memory 214 may be a single memory module, for example. The system memory 212 and the mass storage memory 214 may be adjacent to, part of, programmed with, networked with, and/or remote from processor 202, such that data stored in the system memory 212 and the mass storage memory 214 may be retrieved and processed by the processor 202, for example. The system memory 212 and the mass storage memory 214 may store instructions that are executable by the processor 202. The instructions may be executed to perform one or more of the acts or functions described herein or shown in the figures.

The I/O controller 210 performs functions that enable the processor 202 to communicate with the network interface 218, the display 220, the input device 222, and the output device 224 through an I/O bus 216. While the memory controller 208 and the I/O controller 210 are depicted in FIG. 2 as separate blocks within the chipset 206, the functions performed by these blocks may be integrated within a single semiconductor circuit or may be implemented using two or more separate integrated circuits. One or more of the components of the computing device 200 may be implemented as a system on a chip (for example, a system on a chip in an IPHONE™).

The network interface 218 may be a one-way or two-way communication coupling. Accordingly, the network interface 218 may communicatively connect one, two, or more communication networks or devices. For example, the interconnection bus 204 may be coupled with a gateway similar to gateway 120 of FIG. 1 discussed above via the network interface 218, such that one, some, or all of the components of the computing device 200 are accessible or may communicate with the gateway. As another example, the network interface 218 may couple the interconnection bus 204 with other communication networks. The network interface 218 may be, for example, an integrated services digital network (ISDN) card or a modem to provide a data communication connection. As another example, network interface 218 may be a local area network (LAN) card to provide a data communication connection to a compatible LAN, for example, connected to the Internet. Wireless links may also be implemented. The network interface 218 may send and receive electrical, electromagnetic, or optical signals that carry analog or digital data streams representing various type of information, for example.

The display device 220 may include a visual output device, cathode ray tube (CRT) display, electronic display, electronic paper, flat panel display, light-emitting diode (LED) display, electroluminescent display (ELD), plasma display panel (PDP), liquid crystal display (LCD), thin-film transistor display (TFT), organic light-emitting diode display (OLED), surface-conduction electron-emitter display (SED), laser television, carbon nanotubes, nanocrystal display, head-mounted display, projector, three-dimensional display, and/or transparent display device, for example.

The display device 220 is adapted to display a trading screen. The trading screen may be similar to the trading screens discussed above, for example. The trading screen may be interactive. An interactive trading screen may allow, for example, one or more trading actions to be performed using the trading screen. For example, an interactive trading screen may allow one or more order entry parameters to be set and/or sent using one or more order entry actions. The display device 220 and/or the input device 222 may be used to interact with the trading screen, for example.

The input device 222 may include a keyboard, mouse, microphone, touch-screen, trackball, keypad, joystick, and/or other device for providing input, for example. The input device 222 may be used, for example, to provide command selections to processor 202. For example, the input device 222 may be a mouse that is used to control a cursor displayed on a trading screen. The mouse may include one or more buttons for selection and control, for example.

The output device 224 may include a keyboard, mouse, speakers, touch-screen, trackball, keypad, haptic device or system, joystick, and/or other device for providing output, for example. For example, the output device 224 may be used to output one or more signals, such as a haptic signal or an audio signal, to a user. While the input device 222 and output device 224 are depicted in FIG. 2 as separate blocks, the functions performed by these blocks may be integrated into a single I/O device.

IV. Multi-Broker Order Routing Based on Net Position

Figure 3:
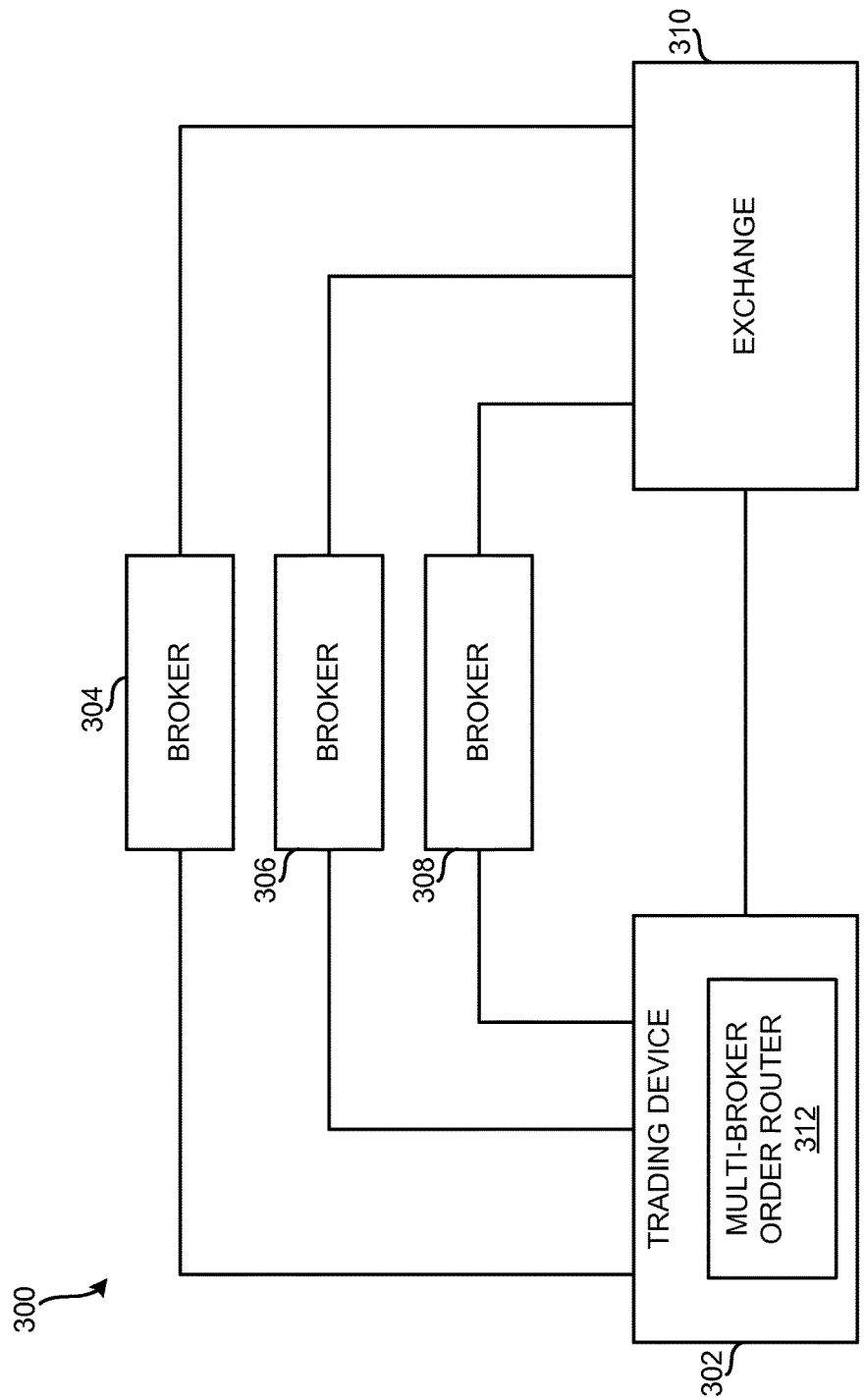
FIG. 3 illustrates an example trading system in which certain embodiments may be employed.

FIG. 3 illustrates an example trading system 300 in which certain embodiments may be employed. The example trading system 300 includes a trading device 302 that can submit a trade order with multiple brokers 304-308. The brokers 304-308 attempt to fill the quantity of the trade order assigned to them. The brokers 304-308 submit trade orders to exchange 310 to attempt to fill the assigned quantity.

The example trading device 302 may be an implementation of, for example, the trading device 110 of FIG. 1. The example exchange 310 may be an implementation of, for example, the exchange 130 of FIG. 1. In certain embodiments, one or more of the brokers 304-308 may attempt to fill the assigned quantity of the trade order at a different exchange from other of the brokers 304-308 and/or at more than one exchange.

To submit the trade order with more than one of the brokers 304-308, the example trading device 302 utilizes a multi-broker order router 312. The example multi-broker order router 312 enables the trading device 302 to request distribution of a trade order among the brokers 304-308 according to an allocation rule. As illustrated in FIG. 3, the example multi-broker order router 312 may be part of the trading device 302. In certain embodiments, the multi-broker order router 312 is part of a separate computing device from the trading device 302, such as a server or gateway, for example.

The example multi-broker order router 312 of FIG. 3 provides an option to the trading device 302 and/or may be configured by the trading device 302 to include a consideration of one or more net positions of the user at one or more of the brokers 304-308 identified in the allocation rules. Thus, unlike in conventional multi-broker systems, the example multi-broker order router 312 of FIG. 3 determines a net position of the user at each broker of the multi-broker strategy and factors the net positions into a determination of how to allocate portions of a trade order quantity among the brokers 304-308.

To factor in the net position of the user at the brokers 304-308 into the allocation determination, the example multi-broker order router 312 receives instructions and/or customizations (for example, via a user interface implemented by the multi-broker order router 312 and/or the trading device 302) regarding the allocation rules. The instructions and/or customizations include particular information related to the user's desire for the net position to be factored into the allocation of portions of a trade order. The example multi-broker order router 312 operates according to, for example, selections made by the user of the trading device 302 regarding the application of net positions at the brokers 304-308 to the allocation determinations. For example, when using the trading device 302 to distribute quantity of a trade order among the brokers 304-308, the user may select an option provided by the example multi-broker order router 312 to route a larger portion of the trade order to one of the brokers 304-308 at which the user has the lowest net position. Moreover, the example multi-broker order router 312 may factor in the net position of the user at the brokers 304-308 into allocation determinations in a plurality of manners according to, for example, the buy/sell direction of the corresponding trade order. Thus, the multi-broker order router 312 may factor in the net position of the user at the brokers 304-308 according to a first allocation rule when the applicable trade order is a buy order and according to a second allocation rule different from the first allocation rule when the applicable trade order is a sell order.

Figure 4:
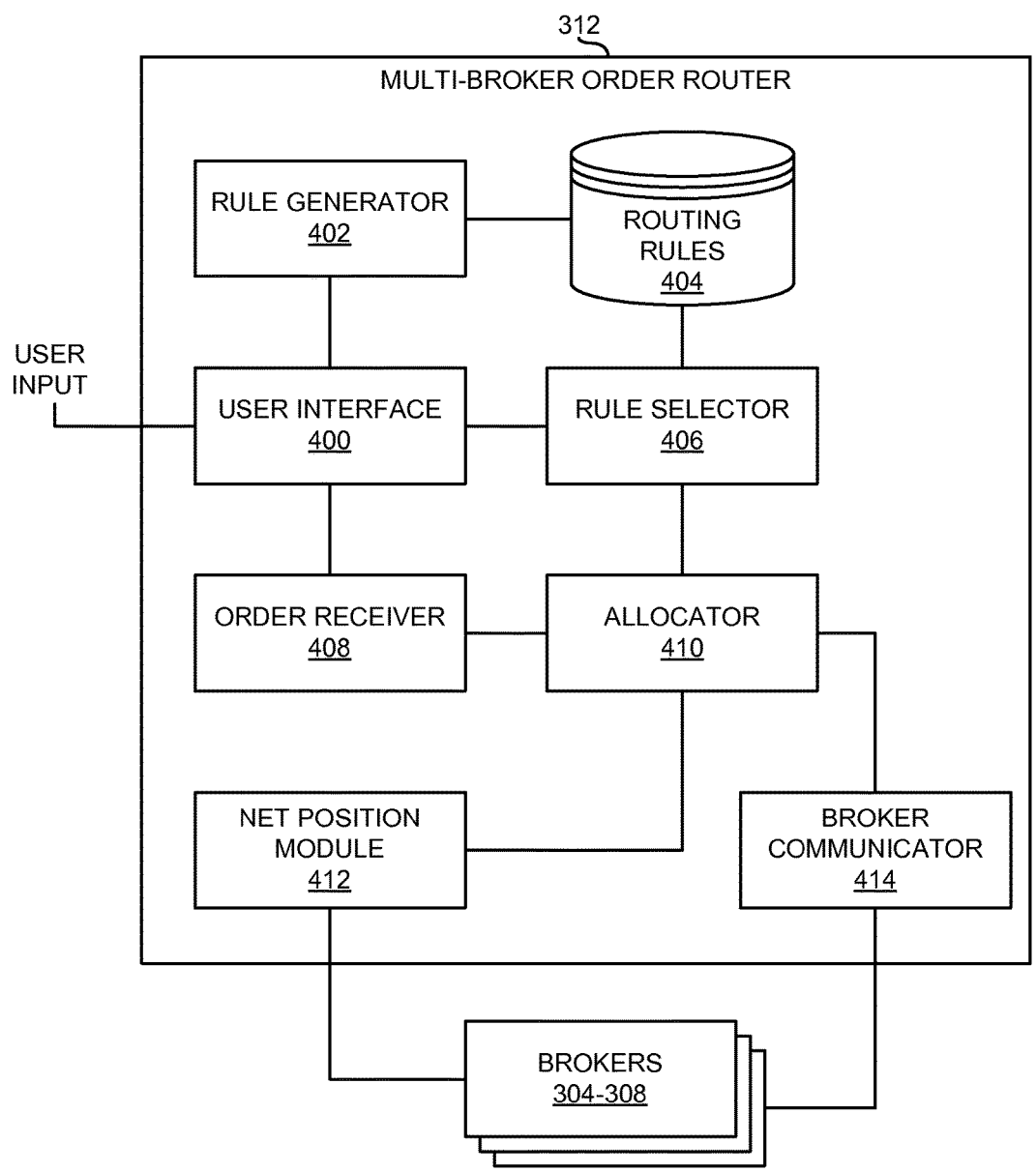
FIG. 4 illustrates a block diagram of an example apparatus that may be used to implement the example multi-broker order router of FIG. 3.

FIG. 4 illustrates a block diagram of an example implementation of the multi-broker order router 312 of FIG. 3. The example multi-broker order router 312 of FIG. 4 implements a user interface 400 capable of receiving information from a user of the trading device 302 of FIG. 3. For example, the user interface 400 may be used by a trader to specify an allocation rule. To receive information, the example user interface 400 implements one or more selection, configuration, and/or input screens. For example, the user interface 400 facilitates a rule configuration screen that enables the user to define one or more allocation rules. As another example, the user interface 400 facilitates a settings screen with a selectable option for consideration of net position when distributing portions of quantity for a trade order.

Figure 5:
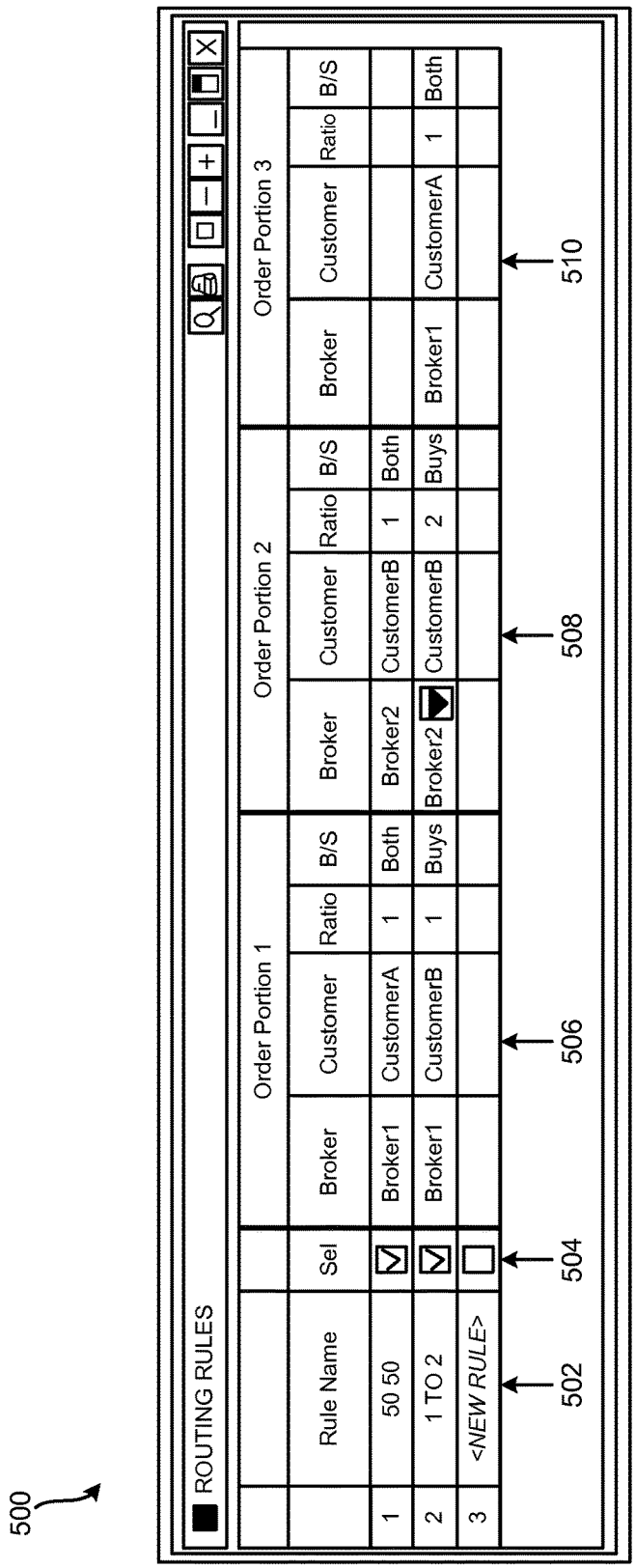
FIG. 5 illustrates a screenshot of an example rule configuration screen.

FIG. 5 is a screenshot of an example implementation of a rule configuration screen 500. The example rule configuration screen 500 includes a plurality of columns each dedicated to a setting or feature of a set of allocation rules to be defined and/or selected by, for example, the user. The example screen 500 includes a name column 502 that includes a label or name (for example, "50-50" or "1 to 2") assigned to each allocation rule. A new allocation rule can be created by clicking on a blank entry of the name column 502. The example screen 500 includes a selection column 504 that includes a selectable box to indicate which of the allocation rules are selected or active for a trading session. The example screen 500 includes a first portion column 506 that defines a plurality of settings or aspects for a first portion of an allocation rule. In the example of FIG. 5, the first portion column 506 identifies a broker to receive the first portion, a customer to which the corresponding allocation rule applies, a type of trade order (for example, buy, sell, or both buy and sell) to which the corresponding allocation rule applies, and a ratio assigned to the identified broker. The example screen 500 includes second and third portion columns 508 and 510, respectively, that define a plurality of settings or aspects for second and, if any, third portions of an allocation rule. In the example of FIG. 5, the second and third portion columns 508 and 510 define similar aspects or settings for an allocation rule as the first portion column 506. When an allocation rule allocates portions of a trade order to only two brokers, the third portion column 510 is left blank. If more than three portions are to be defined, additional portion columns may be added. As shown in FIG. 5, the ratio selected by the user entering information into the rule configuration screen 500 defines what percentage of a trade order is, at least initially, allocated to each of the brokers 304-308. A ratio of one-to-one, for example, is selected for a fifty-fifty distribution between two of the brokers 304-308. Any desirable ratio is possible among any desirable amount of brokers. As described below, the initial allocation of trade order quantity may be altered based on net position of the user at the brokers 304-308 at the time the corresponding trade order is placed.

Information provided to the multi-broker order router 312 via the rule configuration screen 500 is provided to a rule generator 402. In the illustrated example of FIG. 4, the rule generator 402 combines the selections and inputs from the screen 500 to form an allocation rule that can be selected by, for example, a user of the trading device 302 to be applied to one or more trade orders. The rule generator 402 sends the generated allocation rules to a routing rules database 404.

Figure 6:
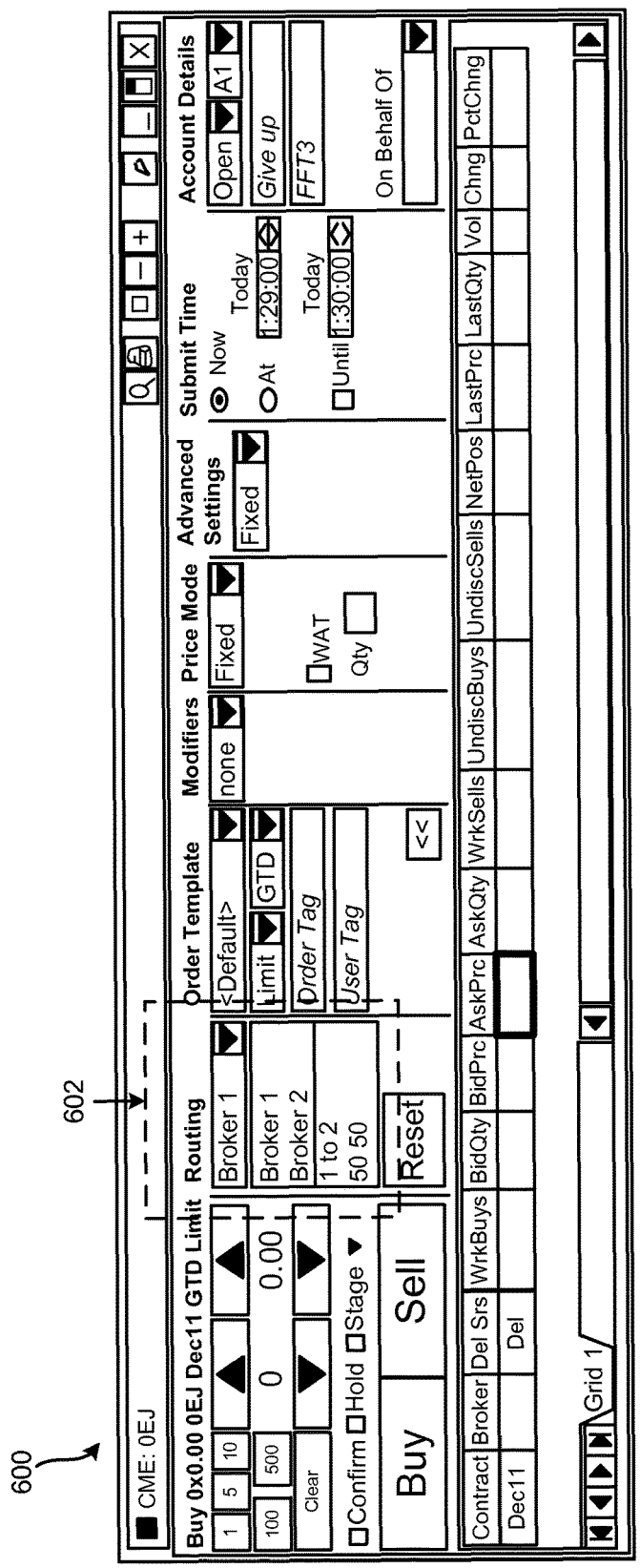
FIG. 6 illustrates a screenshot of a first example trade order screen.

The example user interface 400 of FIG. 4 also facilitates a selection of an allocation rule for application to a trade order. FIG. 6 is a screenshot of a first example trade order screen 600 that can be used to place one or more trade orders and, if the user desires, to request a multi-broker distribution of the trade order(s). The first example trade order screen 600 can be presented on the trading device 302 of FIG. 3, for example. The first example trade order screen 600 includes a plurality of options and inputs for the user to configure a trade order such as, for example, a buy button, a sell button, quantity buttons, modifier buttons, account information buttons, etc. The first example trade order screen 600 also includes a routing section 602 dedicated to a selection of a type of routing to be applied to the trade order(s). The example routing section 602 includes a selectable option to utilize a multi-broker order routing strategy. For example, the trader can select a fifty-fifty allocation rule, a one-to-two allocation rule, etc. The names of the allocation rules in the routing section 602 may correspond to the names of the allocation rules of the name column 502 of FIG. 5.

Figure 7:
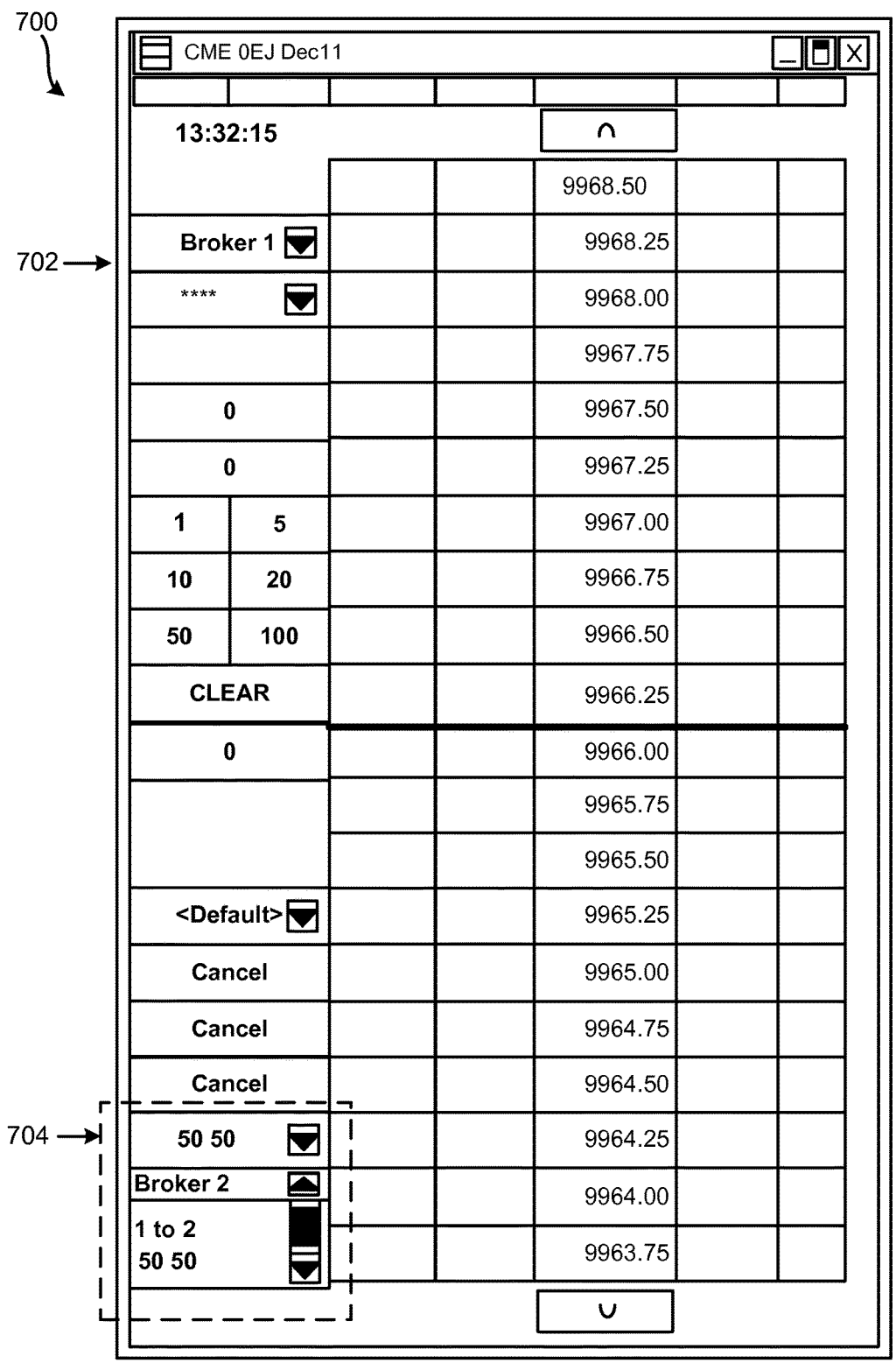
FIG. 7 illustrates a screenshot of a second example trade order screen.

FIG. 7 is a screenshot of a second example trade order screen 700 that can be used to place one or more trade orders and, if the user desires, to request a multi-broker distribution of the trade order(s). In certain embodiments, the second trade order screen 700 is part of a trading application that includes a price axis for order entry. The second example trade order screen 700 can be presented on the trading device 302 of FIG. 3, for example. The second example trade order screen 700 includes a plurality of options and inputs to configure a trade order such as, for example, quantity buttons to be selected for placement of a quantity adjacent to a price in a price column. The second example trade screen 700 of FIG. 7 includes a first broker section 702 and a second broker section 704 for designating that first and second brokers are to receive respective portions or quantities of the trade order. The second broker section 704 includes a first selection portion to select an allocation rule to be applied to the trade order. The names of the selectable allocation rules of the second portion of the second broker section 704 may correspond to the names of the allocation rules of the name column 502 of FIG. 5.

Information conveyed to the multi-broker order router 312 via the first and/or second example trade order screens 600, 700 is provided to a rule selector 406 and an order receiver 408. The example rule sector 406 may receive allocation rule designations on a per order basis. In some circumstances, such as in the absence of a selection from a user, the example rule selector 406 may select one of the allocation rules of the database 404 for application to a trade order. In certain embodiments, a particular allocation rule may be set as a default. In certain embodiments, an allocation rule to be applied may be selected based on a rule set in the rule selector 406. For example, if the corresponding trade order is placed between the hours of nine o'clock a.m. and eleven o'clock a.m., the rule selector 406 may select a first one of the allocation rules of the database 404. As another example, if the corresponding trade order has a quantity greater than one hundred, the rule selector 406 may select a second one of the allocation rules of the database 404. In certain embodiments, the rule selector 406 selects one of the allocation rules of the database 404 based on a type of the trade order (for example, by selecting a third one of the rules for all buy order and a fourth one of the rules for all sell orders). In certain embodiments, the rule selector 406 implements a random selection of an allocation rule from the database 404. Having received or selected a multi-broker allocation rule for the trade order(s), the example rule selector 406 conveys the rule to an allocator 410.

Figure 8:
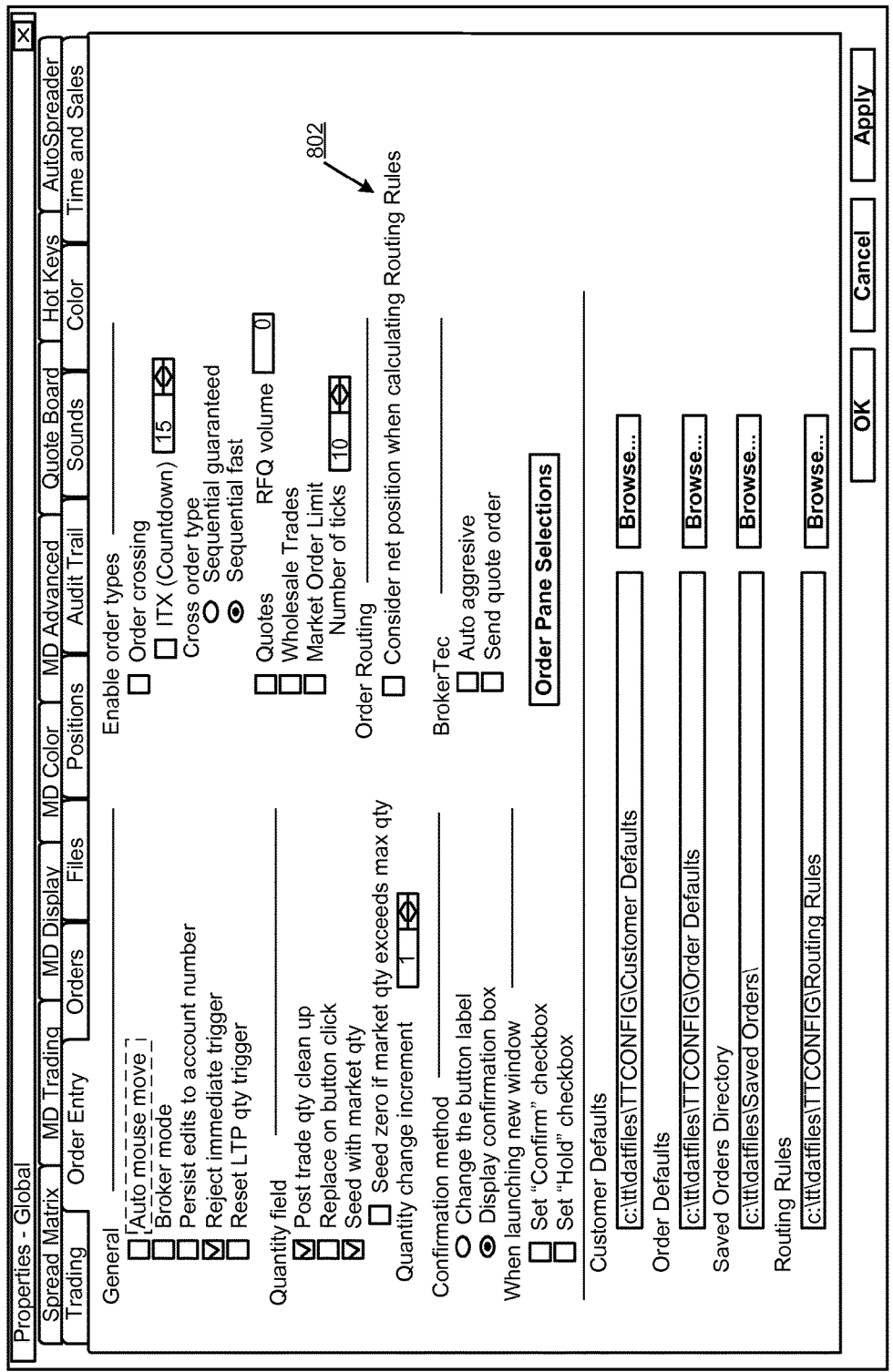
FIG. 8 illustrates a screenshot of an example settings screen.

The order receiver 408 receives the trade order and determines whether net position is to be considered when allocating portions of the trade order. That is, the order receiver 408 determines whether the allocator 410 is to factor net position of the user at the brokers 304-308 into the allocation rule to be applied to the trade order. In certain embodiments, an option provided by the user interface 400 is selected to consider net position of the user at the brokers 304-308. FIG. 8 is a screen shot of an example settings screen 800 that includes a selectable option for consideration of net position when distributing portions or quantities of a trade order. In the illustrated example of FIG. 8, the settings screen 800 includes a plurality of input fields or items related to a plurality of aspects of a trade order. Further, the example settings screen 800 includes a check box 802 that the user of the trading device 302 can toggle between on/off positions. When the check box 802 is selected in the on position, trade orders executed by the user will include an indication (for example, a retrievable flag or metadata) that the trade order is to be distributed among multiple brokers with the overall net position of the user and/or the net position of the user at the brokers factoring into the distribution. In certain embodiments, an option to toggle between the on/off positions of the net position consideration option is not provided. Instead, the net position may be considered for each trade order placed via the multi-broker order router 312. In certain embodiments, the net position may be specified to be considered on a per-trade order basis when the trade order is placed.

The example order receiver 408 provides the received trade order and the indication of whether net position is to be considered in the distribution of the trade order to the allocator 410. When the allocator 410 does not receive an indication that the net position is to be considered, the example allocator 410 uses the allocation rule to allocate portions of the trade order. As described above, the allocation rule defines a ratio of quantities to be distributed among the brokers 304-308. In such instances, the trade order is split into portions (which are trade orders themselves), which are distributed to the brokers 304-308 without consideration of the net position of the user at the brokers 304-308, as is done in current systems.

On the other hand, if the allocator 410 receives an indication that the net position of the user at the brokers 304-308 is to be considered, the example allocator 410 references a net position module 412 and the allocation rule received from the rule selector 406. The example net position module 412 determines the net position with respect to a tradable object associated with the trade order of the user at brokers available to fill at least a portion of the trade order. The net position module 412 provides the net position information to the allocator 410. The allocator 410 then factors the net positions into the allocation rule received from the rule selector 406. Example manners in which the allocator 410 factors the net position information into the allocation of trade order quantity are described below. Further, the allocator 410 may record the received net position information in connection with the corresponding brokers for possible consideration in future net position and/or allocation determinations.

When the allocator 410 has determined a portion of the trade order to be allocated to each of the identified ones of the brokers 304-308, the allocator 410 provides the determinations to a broker communicator 414. The example broker communicator 414 routes the respective portions of the trade order to the corresponding brokers 304-308. Routing a portion of the trade order to one of the brokers 304-308 may involve, for example, sending a message to the broker including a price, a tradeable object identifier, a quantity to be bought or sold, an account identifier, etc.

Figure 9:
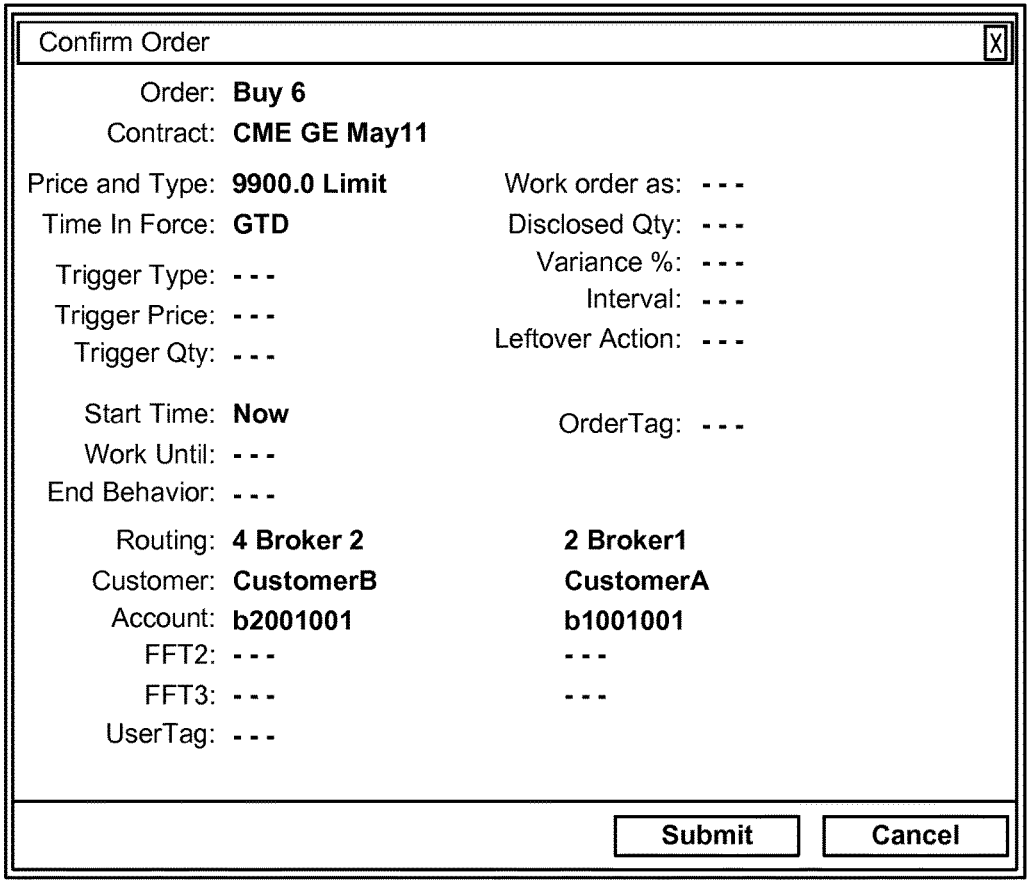
FIG. 9 illustrates a screenshot of an example confirmation screen.

Additionally, the broker communicator 414 may request confirmation of the distribution of the trade order quantity from the user. FIG. 9 is a screenshot of an example confirmation screen 900 that may be provided to a user (for example, via a message, email, or directly on a display device of the trading device 302 implemented by the user interface 400). The confirmation may provide order information such as the tradeable object identifier, the buy/sell direction, the order price, the total order quantity and the order portion quantities allocated to each broker. If the user approves of the distribution of the trade order quantity, the trade order quantity is then routed to the brokers.

Figure 10:
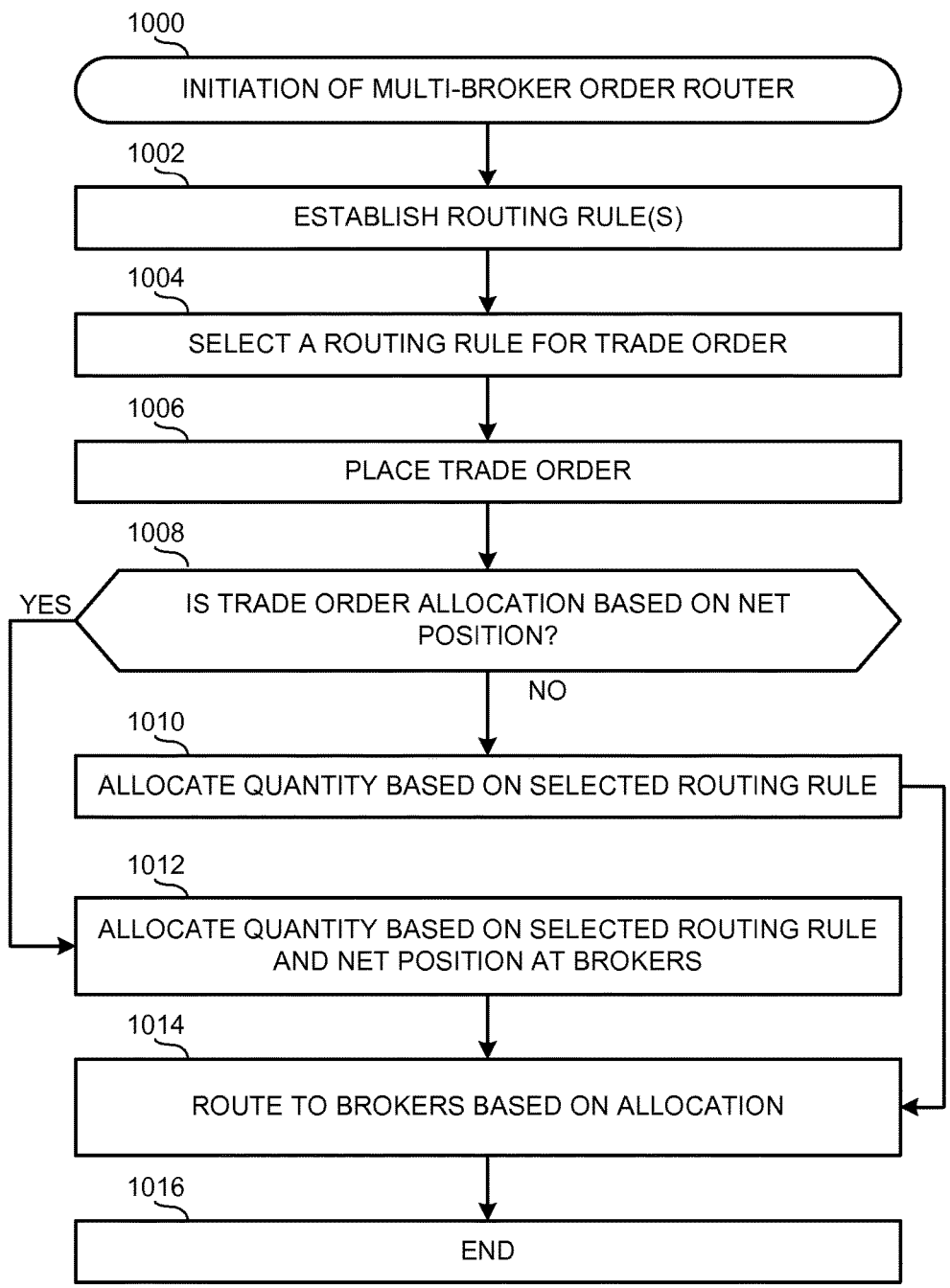
FIG. 10 is a flow diagram illustrative of machine readable instructions that may be executed to implement the example multi-broker order router of FIGS. 3 and/or 4.

FIG. 10 is a flowchart representative of machine readable instructions capable of implementing the example multi-broker order router 312 of FIG. 3. The example flowchart of FIG. 10 begins with an initiation of the multi-broker order router 312 (block 1000). Such an initiation may correspond to execution of the multi-broker order router 312 on the trading device 302 of FIG. 3 via the user interface 400. One or more routing rules are then established and stored in the database 404 (block 1002). The routing rules or allocation rules are configurable by a user (for example, via the rule configuration screen 500 of FIG. 5) and/or are initially included in the database 404 (for example, pre-programmed). The selector 406 selects one of the rules of the database 404 based on, for example, user input, a default, or a condition associated with a current trade order (block 1004). The current trade order is placed via, for example, the first example order screen 600 of FIG. 6 or the second example order screen 700 of FIG. 7 (block 1006). The order receiver 408 determines whether the trade order was placed with a net position consideration option activated (block 1008). For example, the order receiver 408 determines whether the check box 802 of FIG. 8 is toggled in the on position. If net position information associated with the user is not to be considered, the allocator 410 allocates portions or quantities of the current trade order in accordance with the selected allocation rule (block 1010). Alternatively, if the net position information associated with the user is to be considered, the allocator 410 allocates portions of the current trade order in accordance with the allocation rule and the net position information associated with the user (for example, the net positions of the user at the brokers) (block 1012). The broker communicator 1014 routes the allocated portions of the trade order to the appropriate brokers (block 1014). The example of FIG. 10 then ends (block 1016).

A. First Example of Multi-Broker Allocation Based on Net Position

Figure 11:
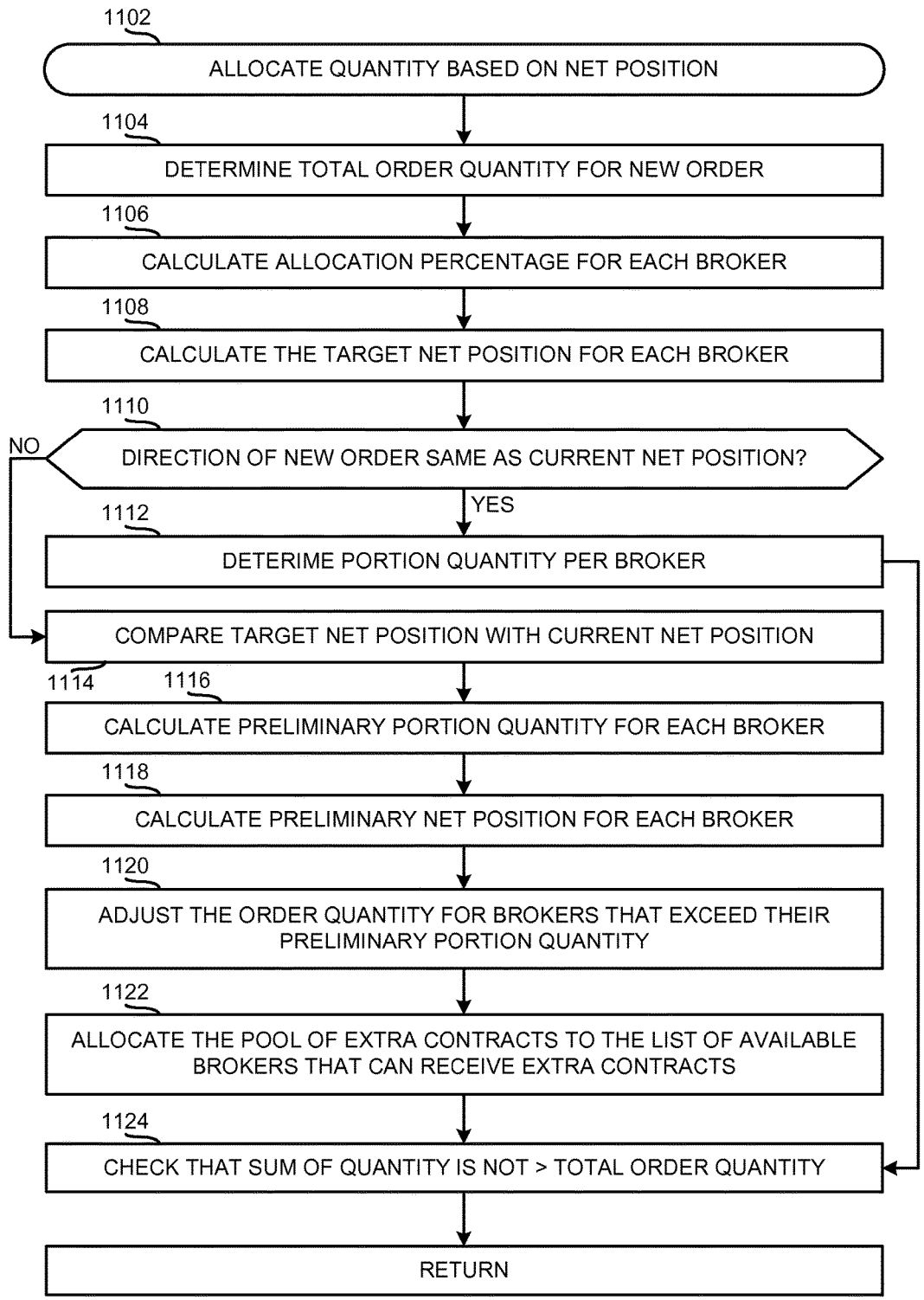
FIG. 11 is a flow diagram illustrative of machine readable instructions that may be executed to implement the example allocator of FIG. 4.

FIG. 11 illustrates an example of multi-broker allocation based on net position. FIG. 11 is a flowchart representative of machine readable instructions that may be executed to implement the example allocator 410 of FIG. 3. The example of FIG. 11 is further described in connection with example scenarios below. In the illustrated example, the flowchart of FIG. 11 may be used to implement block 1012 of the example flowchart of FIG. 10. As indicated in FIG. 10, allocation of the trade order is to be based on net position of the user (block 1102).

At block 1104, the allocator 410 determines a total order quantity (TotalOrderQty) for the new trade order. The TotalOrderQty is the total quantity of the new trade order placed at block 1006 of FIG. 10.

In the example of FIG. 11, the allocator 410 then calculates an allocation percentage for each broker (block 1106). This corresponds to steps (1)-(5) in the example scenarios below. To calculate the allocation percentages, the allocator 410 first analyzes a list of potential order portions and narrows the list based on the direction (for example, buy or sell) of the trade order. Thus, if the order is a buy order, then all "sell" portions are discarded from further consideration on this particular trade order. If the order is a sell order, then all "buy" portions are discarded from further consideration on this particular trade order. In the illustrated example, portions designated as "both" remain available. The allocator 410 then randomly sorts the remaining order portions prior to applying ratio calculations. The randomness ensures that leftover quantities are assigned with equal fairness (for example, such that each broker receives an equal chance of being the first order submitted and receiving a better queue position). The allocator 410 then calculates the current total net position (TotalNetPos) for the user across the brokers included in the list. The allocator 410 then calculates a total expected position (TotalExpectedPos) by adding the TotalNetPos to the TotalOrderQty. The TotalExpectedPos assumes all of the TotalOrderQty will be filled. The allocator 410 then calculates the allocation percentage for each broker as a percentage of the included portions (for example, fifty percent for each broker in a fifty-fifty allocation rule or forty percent for a first broker, forty percent for a second broker, and twenty percent for a third broker in a two-two-one (2/2/1) allocation rule).

In the example of FIG. 11, the allocator 410 calculates a target net position (TargetNetPos) for the user at each broker based on the broker's respective allocation percentage of the TotalExpectedPos (block 1108). This corresponds to step (6) in the example scenarios below. The TargetNetPos is the net position the user should have at a broker, assuming the new trade order quantity assigned to the broker is completely filled.

In the example of FIG. 11, the allocator 410 compares the buy/sell direction of the trade order to the direction of the TotalNetPos (block 1110). If the buy/sell direction of the trade order is the same as the direction of the TotalNetPos (for example, meaning that a buy order adds to an existing long position or a sell order adds to an existing short position), then the allocator 410 calculates the portion quantity (pQty) for each broker by subtracting the current net position at each broker from the target position of the respective broker. This corresponds to step (7) in the example scenarios below. Control then proceeds to block 1124, which is described below.

On the other hand, if the buy/sell direction of the trade order is not the same as the direction of the TotalNetPos (for example, meaning the buy order reverses or reduces an existing short position, or the sell order reverses or reduces an existing long position), then control passes to block 1114 for additional calculations that are performed to prevent exceeding target net positions, and avoid placing order portions that leave some brokers net long and others net short for the user.

In particular, the allocator 410 compares the TargetNetPos of the user at each broker to a net position (NetPos) of the user at a respective broker (block 1114). This corresponds to step (8) in the example scenarios below. The allocator 410 removes any brokers from the list of available brokers (for example, those that can receive extra contracts at the conclusion of the determinations of FIG. 11) if the net position of the user at that broker is already equal to or exceeds the TargetNetPos. Buy orders should not apply to brokers whose NetPos for the user is already greater than their TargetNetPos for the user and sell orders should not apply to brokers whose NetPos for the user is already less than their TargetNetPos for the user.

The allocator 410 then calculates a preliminary portion quantity (pPortionQty) for each broker by applying the respective ratios to the TotalOrderQty (block 1116). This corresponds to step (9) in the example scenarios below. This is called a preliminary calculation because the calculation applies the ratios blindly to the TotalOrderQty without regard for the impact net positions of the user at the brokers may have on the distribution.

The allocator 410 then calculates a preliminary net position (pNetPos) for each broker by adding the pPortionQty for each broker to a corresponding current net position (block 1118). This corresponds to step (10) in the example scenarios below. The allocator 410 then adjusts the order quantity for brokers that exceed their preliminary portion quantity (pPortionQty) (block 1120). This corresponds to steps (11)-(12) in the example scenarios below. Adjusting the order quantity may include, for example, determining whether the preliminary net position (pNetPos) will exceed the target position for each broker by subtracting the TargetNetPos from the pNetPos for each broker. If the difference is positive, then that broker can receive additional orders to get closer to a corresponding ideal target position. Such a broker is included in the list of available brokers who can receive additional orders. If the difference is zero, then that broker will achieve the ideal target position and the pPortionQty does not need to be adjusted. For such brokers, the pPortionQty is their portion quantity (PortionQty). If the difference is negative, the pPortionQty of that broker needs to be adjusted and the amount of the difference goes into a pool of extra orders to be distributed to the list of available brokers. Additionally, adjusting the order quantity at block 1120 may include adjusting the order quantity for those brokers that exceeded their pPortionQty (for example, when the difference at block 1120 is negative) by subtracting the difference at block 1120 from the corresponding pPortionQty. The result is a corresponding PortionQty.

The allocator 410 then allocates the pool of extra trade orders to the list of available brokers that can receive extra trade orders based on a respective ratio of the sum of the available broker ratios (block 1122). This corresponds to step (13) in the example scenarios below. To do so, the allocator 410 calculates a sub-ratio (SubRatio) for each broker by dividing a respective ratio portion by the sum of the ratios of the brokers in the list of available brokers that can receive extra trade orders. The allocator 410 then applies the subRatio for each broker to the pool of available trade orders and adds that amount to their pPortionQty. The result is a PortionQty for each broker.

The allocator 410 then sums each of the PortionQtys of the brokers to ensure that the sum does not exceed the TotalOrderQty, thereby verifying that the proper amount of trade orders was distributed (block 1124). This corresponds to step (14) in the example scenarios below.

The example scenarios described below follow the example flow diagram of FIG. 11.

1. First Example Scenario—Adding to a Long Position

Joe, a trader using trading device 302 of FIG. 3, places a multi-broker trade order of sixteen buy trade orders with two brokers, Broker A and Broker B, split equally according to a fifty-fifty allocation rule. Thus, eight trade orders are sent to Broker A and eight trade orders are sent to Broker B. Broker A fills all eight trade orders, but Broker B only fills two trade orders (for example, because Joe's order is deeper in a queue managed by Broker B). Assuming the orders were GTD, the remaining open quantity is cancelled at the end of the day. Therefore, Joe ends the day long 10 contracts, with eight at Broker A and two at Broker B.

The next day Joe wants to add to his long position, so Joe places an order to buy twenty contracts using the same fifty-fifty allocation rule and wants to maintain a fifty-fifty split on the entire position once the position is filled. That is, the TotalOrderQty for the new trade order is (20). To achieve this, the allocator 410 of FIG. 4 executes the following instructions to determine how to divide up the new order.

(1) The allocator 410 narrows the list of brokers. In this example, each broker is set to "both," so both brokers are included.

(2) The allocator 410 randomly sorts the brokers. For this example, assume Broker A is first; Broker B is second after the sort.

(3) The allocator 410 calculates the current TotalNetPos across the brokers using the following equation (Equation 1):

| Position | + | Position | = | TotalNetPos |
|---|---|---|---|---|
| (Broker A) | | (Broker B) | | |
| 8 | + | 2 | = | 10 |

(4) The allocator 410 calculates the TotalExpectedPos assuming all contracts fill using the following equation (Equation 2):

| TotalNetPos | + | TotalOrderQty | = | TotalExpectedPos |
|---|---|---|---|---|
| 10 | + | 20 | = | 30 |

(5) The allocator 410 calculates the ratios according to allocation rule using the following equations (Equations 3 and 4):

| Broker A | + | Broker B | = | Total Portions |
|---|---|---|---|---|
| portion | | portion | | |
| 50 | + | 50 | = | 100 |

| Portion per | ÷ | Total portions | = | Broker Ratio |
|---|---|---|---|---|
| Broker | | | | Portions |
| 50 (Broker A) | ÷ | 100 | = | 50% (Broker A) |
| 50 (Broker B) | ÷ | 100 | = | 50% (Broker B) |

With reference to FIG. 11, instructions (1)-(5) above correspond to block 1106 of FIG. 11.

(6) The allocator 410 calculates the TargetNetPos for each broker using the following equation (Equation 5), which corresponds to block 1108 of FIG. 11:

| TotalExpectedPos | × | Ratio | = | TargetNetPos per broker |
|---|---|---|---|---|
| 30 | × | 50% | = | 15 (Broker A) |
| 30 | × | 50% | = | 15 (Broker B) |

(7) The allocator 410 compares direction of new order to direction of current net position for each broker, which corresponds to block 1110 of FIG. 11. For this example scenario, the buy/sell direction of the new order (positive twenty) is the same as the current net position (positive ten). Accordingly, the allocator 410 does not perform the adjustment calculations of blocks 1114-1122 of FIG. 11. Instead, the allocator calculates the PortionQty for each broker by subtracting the current net position at each broker from the respective target position, which is reflected in the following equation (Equation 6) that corresponds to block 1112 of FIG. 11:

| TargetNetPos | − | CurrentNetPos | = | PortionQty per broker |
|---|---|---|---|---|
| 15 (Broker A) | − | 8 | = | 7 Broker A |
| 15 (Broker B) | − | 2 | = | 13 Broker B |

(14) The allocator 410 checks the sum of the PortionQty's to ensure that the PortionQty's do not exceed the TotalOrderQty using the following equation (Equation 7), which corresponds to block 1122 of FIG. 11:

| | PortionQty | Compare to | TotalOrderQty | |
|---|---|---|---|---|
| Broker A | 7 | | | |
| Broker B | 13 | | | |
| Sum | 20 | ⟨?⟩ | 20 | OK |

In sum, the allocator 410 allocates a first trade order to buy seven contracts to Broker A and a second trade order to buy thirteen contracts to Broker B. Assuming both orders completely fill, Joe is left long fifteen at each broker.

2. Second Example Scenario—Reducing a Long Position

Joe is long 10 contracts, with 8 at Broker A and 2 at Broker B. Joe wants to reduce his long position, and uses a fifty-fifty routing rule to place a trade order to sell 8 contracts. A simple fifty-fifty split would place two orders to sell contracts 4 each, but that would result in Joe being net long 4 at Broker A and short 2 at Broker B. This should be avoided when dividing up the new sell order, which has a TotalOrderQty equal to (−8). Thus, the allocator 410 of FIG. 4 executes the following instructions to determine how to divide up the new order.

(1) The allocator 410 narrows the list of brokers. In this example, each broker is set to "both," so both brokers are included.

(2) The allocator 410 randomly sorts the brokers. For this example, assume Broker A is first; Broker B is second after the sort.

(3) The allocator 410 calculates the current TotalNetPos across the brokers using the following equation (Equation 8):

| Position (Broker A) | + | Position (Broker B) | = | TotalNetPos |
|---|---|---|---|---|
| 8 | + | 2 | = | 10 |

(4) The allocator 410 calculates the TotalExpectedPos assuming all contracts fill using the following equation (Equation 9):

| TotalNetPos | + | TotalOrderQty | = | TotalExpectedPos |
|---|---|---|---|---|
| 10 | + | (−8) | = | 2 |

(5) The allocator 410 calculates the ratios according to the allocation rule using the following equations (Equation 10 and 11).

| Broker A portion | + | Broker B portion | = | Total Portions |
|---|---|---|---|---|
| 50 | + | 50 | = | 100 |

| Portion per Broker | ÷ | Total portions | = | BrokerRatio Portions |
|---|---|---|---|---|
| 50 (Broker A) | ÷ | 100 | = | 50% (Broker A) |
| 50 (Broker B) | ÷ | 100 | = | 50% (Broker B) |

With reference to FIG. 11, instructions (1)-(5) above correspond to block 1106 of FIG. 11.

(6) The allocator 410 calculates the TargetNetPos for each broker using the following equation (Equation 12), which corresponds to block 1108 of FIG. 11:

| TotalExpectedPos | × | Ratio | = | TargetNetPos per broker |
|---|---|---|---|---|
| 2 | × | 50% | = | 1 (Broker A) |
| 2 | × | 50% | = | 1 (Broker B) |

(7) The allocator 410 compares direction of new order to direction of current net position for each broker, which corresponds to block 1110 of FIG. 11. For this example, the buy/sell direction of the new order (negative 8) is opposite of the current net position (positive 10), so the allocator 410 performs the adjustment calculations of blocks 1114-1122 of FIG. 11.

(8) The allocator 410 compares each broker's TargetNetPos with their current net position using the following equation (Equation 13), which corresponds to block 1114 of FIG. 11:

| Current NetPos per broker | <?> | TargetNetPos | = | Result |
|---|---|---|---|---|
| 8 (Broker A) | <?> | 1 | = | > ; so ok to include Broker A |
| 2 (Broker B) | <?> | 1 | = | > ; so ok to include Broker B |

(9) The allocator 410 calculates the preliminary portion qty (pPortionQty) for each broker using the following equation (Equation 14), which corresponds to block 1116 of FIG. 11:

| TotalOrderQty | × | Ratio | = | pPortionQty per broker |
|---|---|---|---|---|
| (−8) | × | 50% | = | (−4) Broker A |
| (−8) | × | 50% | = | (−4) Broker B |

(10) The allocator 410 calculates the preliminary net position (pNetPos) for each broker using the following equation (Equation 15), which corresponds to block 1118 of FIG. 11:

| Current position per broker | + | pPortionQty | = | pNetPos per broker |
|---|---|---|---|---|
| 8 (Broker A) | + | (−4) | = | 4 Broker A |
| 2 (Broker B) | + | (−4) | = | (−2) Broker B |

(11) The allocator 410 determines the difference of the preliminary net position from the target position using the following equation (Equation 16), which corresponds to block 1120 of FIG. 11:

| pNetPos per broker | − | TargetNetPos | = | Available adjustment per broker |
|---|---|---|---|---|
| 4 (Broker A) | − | 1 | = | 3 Broker A |
| (−2) (Broker B) | − | 1 | = | (−3) Broker B |

Broker A would not exceed its target position (the net difference is positive 3), so Broker A goes into the list of available brokers who can receive extra trade orders. Broker B would exceed its target position by 3, so the (−3) goes into a pool of extra trade orders.

(12) The allocator 410 adjusts the order qty for the brokers that exceeded their pPortionQty using the following equation (Equation 17), which corresponds to block 1120 of FIG. 11. In this example, this list only includes Broker B:

$$\frac{\begin{array}{ccc} \dfrac{pPortionQty}{\text{per broker}} & - \text{ Extra } qty = & \dfrac{\text{Available PortionQty}}{\text{per broker}} \\ (-4) \text{ (Broker } B) & - \quad (-3) \quad = & (-1) \text{ Broker } B \end{array}}{}$$

(13) The allocator 410 allocates the pool of extra trade orders to the list of available brokers that can receive extra trade orders using the following equation (Equation 18), which corresponds to block 1122 of FIG. 11. In this example, the list includes only one available broker (Broker A), so Broker A receives the full amount (−3).

$$\frac{\begin{array}{ccc} \dfrac{pPortionQty}{\text{per broker}} & + \text{ Extra } qty = & \dfrac{\text{Available PortionQty}}{\text{per broker}} \\ (-4) \text{ (Broker } A) & + \quad (-3) \quad = & (-7) \text{ Broker } A \end{array}}{}$$

(14) The allocator 410 checks the sum of the PortionQty's to ensure that they do not exceed the TotalOrderQty using the following equation (Equation 19), which corresponds to block 1124 of FIG. 11:

| | PortionQty | Compare to | TotalOrderQty | |
|---|---|---|---|---|
| Broker A | (−7) | | | |
| Broker B | (−1) | | | |
| Sum | (−8) | <?> | (−8) | OK |

In sum, the allocator 410 places a first sell order of 7 at Broker A and a second sell order of 1 at Broker B. Assuming both orders completely fill, Joe is left long 1 at each broker.

3. Third Example Scenario—Flattening a Long Position

Joe is long 10 contracts, with 8 at Broker A and 2 at Broker B. Joe wants to flatten his long position, and uses a fifty-fifty routing rule to place a trade order to sell 10 contracts, and expects to be flat at both brokers when all the orders fill. A simple fifty-fifty split would place two orders to sell 5 each, but that would result in Joe being net long 3 at Broker A and short 3 at Broker B. This should be avoided when dividing up the new sell order, which has a TotalOrderQty equal to (−10). Thus, the allocator 410 of FIG. 4 executes the following instructions to determine how to divide up the new order.

(1) The allocator 410 narrows the list of brokers. In this example, each broker is set to "both," so both brokers are included.

(2) The allocator 410 randomly sorts the brokers. For this example, assume Broker A is first; Broker B is second after the sort.

(3) The allocator 410 calculates the current TotalNetPos across the brokers using the following equation (Equation 20):

$$\frac{\begin{array}{ccc} \dfrac{\text{Position}}{\text{(Broker } A)} & + & \dfrac{\text{Position}}{\text{(Broker } B)} = \text{TotalNetPos} \\ 8 & + & 2 \quad = \quad 10 \end{array}}{}$$

(4) The allocator 410 calculates the TotalExpectedPos assuming all contracts fill using the following equation (Equation 21):

$$\frac{\begin{array}{ccc} \text{TotalNetPos} & + & \text{TotalOrderQty} = \text{TotalExpectedPos} \\ 10 & + & (-10) \quad = \quad 0 \end{array}}{}$$

(5) The allocator 410 calculates the ratios according to the allocation rule using the following equations (Equations 22 and 23).

$$\frac{\begin{array}{ccc} \dfrac{\text{Broker } A}{\text{portion}} & + & \dfrac{\text{Broker } B}{\text{portion}} = \dfrac{\text{Total}}{\text{Portions}} \\ 50 & + & 50 \quad = \quad 100 \end{array}}{}$$

$$\frac{\begin{array}{ccc} \dfrac{\text{Portion per}}{\text{Broker}} & \div & \dfrac{\text{Total}}{\text{portions}} = \dfrac{\text{Broker Ratio}}{\text{Portions}} \\ 50 \text{ (Broker } A) & \div & 100 \quad = \quad 50\% \text{ (Broker } A) \\ 50 \text{ (Broker } B) & \div & 100 \quad = \quad 50\% \text{ (Broker } B) \end{array}}{}$$

With reference to FIG. 11, instructions (1)-(5) above correspond to block 1106 of FIG. 11.

(6) The allocator 410 calculates the TargetNetPos for each broker using the following equation (Equation 24), which corresponds to block 1108 of FIG. 11:

$$\frac{\begin{array}{ccc} \text{TotalExpectedPos} \times \text{Ratio} = & \text{TargetNetPos per broker} \\ 0 \quad \times \quad 50\% \quad = & 1 \text{ (Broker } A) \\ 0 \quad \times \quad 50\% \quad = & 1 \text{ (Broker } B) \end{array}}{}$$

(7) The allocator 410 compares direction of new order to direction of current net position for each broker, which corresponds to block 1110 of FIG. 11. For this example, the buy/sell direction of the new order (negative 10) is opposite of the current net position (positive 10), so the allocator 410 performs the adjustment calculations of blocks 1114-1122 of FIG. 11.

(8) The allocator 410 compares each broker's TargetNetPos with their current net position using the following equation (Equation 25), which corresponds to block 1114 of FIG. 11:

| Current NetPos per broker | <?> | TargetNetPos | = | Result |
|---|---|---|---|---|
| 8 (Broker A) | <?> | 0 | = | > ; so ok to include Broker A |
| 2 (Broker B) | <?> | 0 | = | > ; so ok to include Broker B |

(9) The allocator 410 calculates the preliminary portion qty (pPortionQty) for each broker using the following equation (Equation 26), which corresponds to block 1116 of FIG. 11:

$$\text{TotalOrderQty} \times \text{Ratio} = \dfrac{pPortionQty}{\text{per broker}}$$

-continued

| | | | | |
|---|---|---|---|---|
| (−10) | × | 50% | = | (−5) Broker A |
| (−10) | × | 50% | = | (−5) Broker B |

(10) The allocator 410 calculates the preliminary net position (pNetPos) for each broker using the following equation (Equation 27), which corresponds to block 1118 of FIG. 11:

| Current position per broker | + | pPortionQty | = | pNetPos per broker |
|---|---|---|---|---|
| 8 (Broker A) | + | (−5) | = | 3 Broker A |
| 2 (Broker B) | + | (−5) | = | (−3) Broker B |

(11) The allocator 410 determines the difference of the preliminary net position from the target position using the following equation (Equation 28), which corresponds to block 1120 of FIG. 11:

| pNetPos per broker | − | TargetNetPos | = | Available adjustment per broker |
|---|---|---|---|---|
| 3 (Broker A) | − | 0 | = | 3 Broker A |
| (−3) (Broker B) | − | 0 | = | (−3) Broker B |

Broker A would not exceed the target position for Broker A (the net difference is positive 3), so Broker A goes into the list of available brokers who can receive extra trade orders. Broker B would exceed the target position for Broker B by 3, so the (−3) goes into a pool of extra trade orders.

(12) The allocator 410 adjusts the order qty for the brokers that exceeded their pPortionQty using the following equation (Equation 29), which corresponds to block 1120 of FIG. 11. In this example, this list only includes Broker B:

| pPortionQty per broker | − | Extra qty | = | Adjusted order qty per broker |
|---|---|---|---|---|
| (−5) (Broker B) | − | (−3) | = | (−2) Broker B |

(13) The allocator 410 allocates the pool of extra trade orders to the list of available brokers that can receive extra trade orders using the following equation (Equation 30), which corresponds to block 1122 of FIG. 11. In this example, the list includes only one available broker (Broker A), so Broker A receives the full amount (−3).

| pPortionQty per broker | + | Extra qty | = | Adjusted order qty per broker |
|---|---|---|---|---|
| (−5) (Broker A) | + | (−3) | = | (−8) Broker A |

(14) The allocator 410 checks the sum of the PortionQty's to ensure that they do not exceed the TotalOrderQty using the following equation (Equation 31), which corresponds to block 1124 of FIG. 11:

| | PortionQty | Compare to | TotalOrderQty | |
|---|---|---|---|---|
| Broker A | (−8) | | | |
| Broker B | (−1) | | | |
| Sum | (−10) | ⟨?⟩ | (−10) | OK |

In sum, the allocator 410 places a first sell order of 8 at Broker A and a second sell order of 2 at Broker B. Assuming both orders completely fill, Joe is left flat at each broker.

4. Fourth Example Scenario—Reverse a Long Position to a Net Short

Joe is long 10 contracts, with 8 at Broker A and 2 at Broker B. Joe wants to reverse his long position, and uses a fifty-fifty routing rule to place a trade order to sell 20 contracts, and expects to be short 10 (short 5 at both brokers) when all the orders fill. A simple fifty-fifty split would place two orders to sell 10 each, but that would result in Joe being short 2 at Broker A and short 8 at Broker B. This should be avoided when dividing up the new sell order, which has a TotalOrderQty equal to (−20). Thus, the allocator 410 of FIG. 4 executes the following instructions to determine how to divide up the new order.

(1) The allocator 410 narrows the list of brokers. In this example, each broker is set to "both," so both brokers are included.

(2) The allocator 410 randomly sorts the brokers. For this example, assume Broker A is first; Broker B is second after the sort.

(3) The allocator 410 calculates the current TotalNetPos across the brokers using the following equation (Equation 32):

| Position (Broker A) | + | Position (Broker B) | = | TotalNetPos |
|---|---|---|---|---|
| 8 | + | 2 | = | 10 |

(4) The allocator 410 calculates the TotalExpectedPos assuming all contracts fill using the following equation (Equation 33):

| TotalNetPos | + | TotalOrderQty | = | TotalExpectedPos |
|---|---|---|---|---|
| 10 | + | (−20) | = | (−10) |

(5) The allocator 410 calculates the ratios according to the allocation rule using the following equations (Equations 34 and 35).

| Broker A portion | + | Broker B portion | = | Total Portions |
|---|---|---|---|---|
| 50 | + | 50 | = | 100 |

| Portion per Broker | ÷ | Total portions | = | Broker Ratio Portions |
|---|---|---|---|---|
| 50 (Broker A) | ÷ | 100 | = | 50% (Broker A) |
| 50 (Broker B) | ÷ | 100 | = | 50% (Broker B) |

With reference to FIG. 11, instructions (1)-(5) above correspond to block 1106 of FIG. 11.

(6) The allocator 410 calculates the TargetNetPos for each broker using the following equation (Equation 36), which corresponds to block 1108 of FIG. 11:

$$\text{TotalExpectedPos} \times \text{Ratio} = \frac{\text{TargetNetPos per}}{\text{broker}}$$

| | | | | |
|---|---|---|---|---|
| (−10) | × | 50% | = | (−5) (Broker A) |
| (−10) | × | 50% | = | (−5) (Broker B) |

(7) The allocator 410 compares direction of new order to direction of current net position for each broker, which corresponds to block 1110 of FIG. 11. For this example, the buy/sell direction of the new order (negative 20) is opposite of the current net position (positive 10), so the allocator 410 performs the adjustment calculations of blocks 1114-1122 of FIG. 11.

(8) The allocator 410 compares each broker's TargetNetPos with their current net position using the following equation (Equation 37), which corresponds to block 1114 of FIG. 11:

| Current NetPos per broker | ⟨?⟩ | TargetNetPos | = | Result |
|---|---|---|---|---|
| 8 (Broker A) | ⟨?⟩ | (−5) | = | >; so ok to include Broker A |
| 2 (Broker B) | ⟨?⟩ | (−5) | = | >; so ok to include Broker B |

(9) The allocator 410 calculates the preliminary portion qty (pPortionQty) for each broker using the following equation (Equation 38), which corresponds to block 1116 of FIG. 11:

$$\text{TotalOrderQty} \times \text{Ratio} = \frac{\text{pPortionQty per}}{\text{broker}}$$

| | | | | |
|---|---|---|---|---|
| (−20) | × | 50% | = | (−10) Broker A |
| (−20) | × | 50% | = | (−10) Broker B |

(10) The allocator 410 calculates the preliminary net position (pNetPos) for each broker using the following equation (Equation 39), which corresponds to block 1118 of FIG. 11:

| Current position per broker | + | pPortionQty | = | pNetPos per broker |
|---|---|---|---|---|
| 8 (Broker A) | + | (−10) | = | (−2) Broker A |
| 2 (Broker B) | + | (−10) | = | (−8) Broker B |

(11) The allocator 410 determines the difference of the preliminary net position from the target position using the following equation (Equation 40), which corresponds to block 1120 of FIG. 11:

| pNetPos per broker | − | TargetNetPos | = | Available adjustment per broker |
|---|---|---|---|---|
| (−2) (Broker A) | − | (−5) | = | 3 Broker A |
| (−8) (Broker B) | − | (−5) | = | (−3) Broker B |

Broker A would not exceed the target position for Broker A (the net difference is positive 3), so Broker A goes into the list of available brokers who can receive extra trade orders. Broker B would exceed the target position for Broker B by 3 contracts, so the (−3) goes into a pool of extra trade orders.

(12) The allocator 410 adjusts the order qty for the brokers that exceeded their pPortionQty using the following equation (Equation 41), which corresponds to block 1120 of FIG. 11. In this example, this list only includes Broker B:

| pPortionQty per broker | − | Extra qty | = | Adjusted order qty per broker |
|---|---|---|---|---|
| (−10) (Broker B) | − | (−3) | = | (−7) Broker B |

(13) The allocator 410 allocates the pool of extra trade orders to the list of available brokers that can receive extra trade orders using the following equation (Equation 42), which corresponds to block 1122 of FIG. 11. In this example, the list includes only one available broker (Broker A), so Broker A receives the full amount (−3).

| pPortionQty per broker | + | Extra qty | = | Adjusted order qty per broker |
|---|---|---|---|---|
| (−10) (Broker A) | + | (−3) | = | (−13) Broker A |

(14) The allocator 410 checks the sum of the PortionQty's to ensure that they do not exceed the TotalOrderQty using the following equation (Equation 43), which corresponds to block 1124 of FIG. 11:

| | PortionQty | Compare to | TotalOrderQty | |
|---|---|---|---|---|
| Broker A | (−13) | | | |
| Broker B | (−7) | | | |
| Sum | (−20) | ⟨?⟩ | (−20) | OK |

In sum, the allocator 410 places a first sell order of 13 at Broker A and a second sell order of 7 at Broker B. Assuming both orders completely fill, Joe is left short at each broker.

5. Fifth Example Scenario—Add to a Long Position with Three Brokers

Joe begins with the same long 10 scenario as in the first example scenario above. That is, Joe is long 8 at Broker A and long 2 at Broker B. The next day Joe wants to add to his position and buy 20 more contracts, but uses a different routing rule. The new routing rule is a two-two-one (2/2/1) split with forty percent to Broker A, forty percent to Broker B and twenty percent to Broker C. To achieve the desired split across the three brokers, the allocator 410 executes the following instructions to determine how to divide up the order, which has a TotalOrderQty equal to 20.

(1) The allocator 410 narrows the list of brokers. In this example, each broker is set to "both," so both brokers are included.

(2) The allocator 410 randomly sorts the brokers. For this example, assume Broker A is first, Broker B is second, and Broker C is third after the sort.

(3) The allocator 410 calculates the current TotalNetPos across the brokers using the following equation (Equation 44):

$$\frac{\text{Position}}{\text{(Broker } A\text{)}} + \frac{\text{Position}}{\text{(Broker } B\text{)}} + \frac{\text{Position}}{\text{(Broker } C\text{)}} = \text{TotalNetPos}$$
$$8 + 2 + 0 = 10$$

(4) The allocator 410 calculates the TotalExpectedPos assuming all contracts fill using the following equation (Equation 45):

$$\frac{\text{TotalNetPos} + \text{TotalOrderQty} = \text{TotalExpectedPos}}{10 + 20 = 30}$$

(5) The allocator 410 calculates the ratios according to the allocation rule using the following equations (Equations 46 and 47).

| Broker A portion | + | Broker B portion | + | Broker C portion | = | Total Portions |
|---|---|---|---|---|---|---|
| 2 | + | 2 | + | 1 | = | 5 |
| Portion per Broker | ÷ | Total portions | = | Broker Ratio Portions | | |
| 2 (Broker A) | ÷ | 5 | = | 40% (Broker A) | | |
| 2 (Broker B) | ÷ | 5 | = | 40% (Broker B) | | |
| 1 (Broker B) | ÷ | 5 | = | 20% (Broker C) | | |

With reference to FIG. 11, instructions (1)-(5) above correspond to block 1106 of FIG. 11.

(6) The allocator 410 calculates the TargetNetPos for each broker using the following equation (Equation 48), which corresponds to block 1108 of FIG. 11:

| TotalExpectedPos | × | Ratio | = | TargetNetPos per broker |
|---|---|---|---|---|
| 30 | × | 40% | = | 12 (Broker A) |
| 30 | × | 40% | = | 12 (Broker B) |
| 30 | × | 20% | = | 6 (Broker C) |

(7) The allocator 410 compares direction of new order to direction of current net position for each broker, which corresponds to block 1110 of FIG. 11. For this example, the buy/sell direction of the new order (positive 20) is the same as the current net position (positive 10), so the allocator 410 does not perform the adjustment calculations of blocks 1114-1122 of FIG. 11. Instead, the allocator 410 calculates the new order qty to submit to each broker by subtracting the current net position at each broker from the respective target position according to the following equation (Equation 49), which corresponds to block 1112 of FIG. 11:

| TargetNetPos | − | CurrentNetPos | = | Order qty per broker |
|---|---|---|---|---|
| 12 (Broker A) | − | 8 | = | 4 Broker A |
| 12 (Broker B) | − | 2 | = | 10 Broker B |
| 6 (Broker C) | − | 0 | = | 6 Broker B |

(14) The allocator 410 checks the sum of the PortionQty's to ensure that they do not exceed the TotalOrderQty using the following equation (Equation 50), which corresponds to block 1124 of FIG. 11:

| | PortionQty | Compare to | TotalOrderQty | |
|---|---|---|---|---|
| Broker A | 4 | | | |
| Broker B | 10 | | | |
| Broker C | 6 | | | |
| Sum | 20 | <?> | 20 | OK |

In sum, the allocator 410 places a buy order of 4 at Broker A, a buy order of 10 at Broker B, and a buy order of 6 at Broker C. Assuming both orders completely fill, Joe is left long his desired two-two-one split at each broker.

6. Sixth Example Scenario—Reduce a Long Position with Three Brokers

Joe normally trades with three brokers using a two-two-one (2/2/1) split and comes into the day long 30. However, Joe's current split amongst the three brokers does not match his desired distribution, and Joe is long 13 at Broker A, long 12 at Broker B and long 5 at Broker C.

Joe wants to reduce his position and places a trade order to sell 10 contracts. Joe uses the same two-two-one routing rule and expects to achieve the same two-two-one net position across the three brokers. Thus, the allocator 410 of FIG. 4 executes the following instructions to determine how to divide up the new order, which has a TotalOrderQty equal to (−10).

(1) The allocator 410 narrows the list of brokers. In this example, each broker is set to "both," so both brokers are included.

(2) The allocator 410 randomly sorts the brokers. For this example, assume Broker A is first, Broker B is second, and Broker C is third after the sort.

(3) The allocator 410 calculates the current TotalNetPos across the brokers using the following equation (Equation 51):

$$\frac{\text{Position}}{\text{(Broker } A\text{)}} + \frac{\text{Position}}{\text{(Broker } B\text{)}} + \frac{\text{Position}}{\text{(Broker } C\text{)}} = \text{TotalNetPos}$$
$$13 + 12 + 5 = 30$$

(4) The allocator 410 calculates the TotalExpectedPos assuming all contracts fill using the following equation (Equation 52):

$$\frac{\text{TotalNetPos} + \text{TotalOrderQty} = \text{TotalExpectedPos}}{30 + (-10) = 20}$$

(5) The allocator 410 calculates the ratios according to the allocation rule using the following equations (Equations 53 and 54):

| Broker A portion | + | Broker B portion | + | Broker C portion | = | Total Portions |
|---|---|---|---|---|---|---|
| 2 | + | 2 | + | 1 | = | 5 |
| Portion per Broker | ÷ | Total portions | = | Broker Ratio Portions | | |
| 2 (Broker A) | ÷ | 5 | = | 40% (Broker A) | | |
| 2 (Broker B) | ÷ | 5 | = | 40% (Broker B) | | |
| 1 (Broker B) | ÷ | 5 | = | 20% (Broker C) | | |

With reference to FIG. 11, instructions (1)-(5) above correspond to block 1106 of FIG. 11.

(6) The allocator 410 calculates the TargetNetPos for each broker using the following equation (Equation 55), which corresponds to block 1108 of FIG. 11:

| TotalExpectedPos | × | Ratio | = | TargetNetPos per broker |
|---|---|---|---|---|
| 20 | × | 40% | = | 8 (Broker A) |
| 20 | × | 40% | = | 8 (Broker B) |
| 20 | × | 20% | = | 4 (Broker C) |

(7) The allocator 410 compares direction of new order to direction of current net position for each broker, which corresponds to block 1110 of FIG. 11. For this example, the buy/sell direction of the new order (negative 10) is opposite of the current net position (positive 30), so the allocator 410 performs the adjustment calculations of blocks 1114-1122 of FIG. 11.

(8) The allocator 410 compares each broker's TargetNetPos with their current net position using the following equation (Equation 56), which corresponds to block 1114 of FIG. 11:

| Current NetPos per broker | < ? > | TargetNetPos | = | Result |
|---|---|---|---|---|
| 13 (Broker A) | < ? > | 8 | = | > ; so ok to include Broker A |
| 12 (Broker B) | < ? > | 8 | = | > ; so ok to include Broker B |
| 5 (Broker C) | < ? > | 4 | = | > ; so ok to include Broker C |

(9) The allocator 410 calculates the preliminary portion qty (pPortionQty) for each broker using the following equation (Equation 57), which corresponds to block 1116 of FIG. 11:

| TotalOrderQty | × | Ratio | = | pPortionQty per broker |
|---|---|---|---|---|
| (−10) | × | 40% | = | (−4) Broker A |
| (−10) | × | 40% | = | (−4) Broker B |
| (−10) | × | 20% | = | (−2) Broker C |

(10) The allocator 410 calculates the preliminary net position (pNetPos) for each broker using the following equation (Equation 58), which corresponds to block 1118 of FIG. 11:

| Current position per broker | + | pPortionQty | = | pNetPos per broker |
|---|---|---|---|---|
| 13 (Broker A) | + | (−4) | = | 9 Broker A |
| 12 (Broker B) | + | (−4) | = | 8 Broker B |
| 5 (Broker C) | + | (−2) | = | 3 Broker C |

(11) The allocator 410 determines the difference of the preliminary net position from the target position using the following equation (Equation 59), which corresponds to block 1120 of FIG. 11:

| pNetPos per broker | − | TargetNetPos | = | Available adjustment per broker |
|---|---|---|---|---|
| 9 (Broker A) | − | 8 | = | 1 Broker A |
| 8 (Broker B) | − | 8 | = | 0 Broker B |
| 3 (Broker C) | − | 4 | = | (−1) Broker C |

Broker A would not exceed the target position for Broker A (the net difference is positive 1), so Broker A goes into the list of available brokers who can receive extra trade orders. Broker B equals its target position, so Broker B is done and its PortionQty is (−4). Broker C would exceed its target portion by 1 contract, so the (−1) goes into the pool of extra trade orders.

(12) The allocator 410 adjusts the order qty for the brokers that exceeded their pPortionQty using the following equation (Equation 60), which corresponds to block 1120 of FIG. 11. In this example, this list only includes Broker C:

| pPortionQty per broker | − | Extra qty | = | Adjusted PortionQty per broker |
|---|---|---|---|---|
| (−4) (Broker C) | − | (−1) | = | (−3) Broker C |

(13) The allocator 410 allocates the pool of extra trade orders to the list of available brokers that can receive extra trade orders using the following equation (Equation 61), which corresponds to block 1122 of FIG. 11. In this example, the list includes only one available broker (Broker A), so Broker A receives the full amount (−1).

| pPortionQty per broker | + | Extra qty | = | Adjusted PortionQty per broker |
|---|---|---|---|---|
| (−4) (Broker A) | + | (−1) | = | (−5) Broker A |

(14) The allocator 410 checks the sum of the PortionQty's to ensure that they do not exceed the TotalOrderQty using the following equation (Equation 62), which corresponds to block 1124 of FIG. 11:

|  | PortionQty | Compare to | TotalOrderQty |  |
|---|---|---|---|---|
| Broker A | (−5) |  |  |  |
| Broker B | (−4) |  |  |  |
| Broker C | (−1) |  |  |  |
| Sum | (−10) | < ? > | (−10) | OK |

In sum, the allocator 410 places a sell order of 5 at Broker A, a sell order of 4 at Broker B and a sell order of 1 at Broker C. Assuming both orders completely fill, Joe has reduced his position and has achieved the desired two-two-one split at each broker.

7. Seventh Example Scenario—Reduce a Long Position with Three Brokers, with Extra Quantities Assigned to Two Brokers This example is similar to example scenario six above, but with different quantities to illustrate a calculation of allocating adjusted extra quantities. Joe normally trades with three brokers using a two-two-one (2/2/1) split and comes into the day long 30. However, Joe's current split amongst the three brokers does not match the desired distribution, and Joe is long 9 at Broker A, long 14 at Broker B and long 7 at Broker C.

Joe wants to reduce his position and places a trade order to sell 20 contracts. Joes uses the same two-two-one routing rule and expects to achieve the same two-two-one net position across the three brokers. Thus, the allocator 410 of FIG. 4 executes the following instructions to determine how to divide up the new order, which has a TotalOrderQty equal to (−20).

(1) The allocator 410 narrows the list of brokers. In this example, each broker is set to "both," so both brokers are included.

(2) The allocator 410 randomly sorts the brokers. For this example, assume Broker A is first, Broker B is second and Broker C is third after the sort.

(3) The allocator 410 calculates the current TotalNetPos across the brokers using the following equation (Equation 63):

$$\frac{\text{Position} + \text{Position} + \text{Position}}{\text{(Broker }A\text{)} \quad \text{(Broker }B\text{)} \quad \text{(Broker }C\text{)}} = \text{TotalNetPos}$$
$$9 + 14 + 7 = 30$$

(4) The allocator 410 calculates the TotalExpectedPos assuming all contracts fill using the following equation (Equation 64):

$$\frac{\text{TotalNetPos} + \text{TotalOrderQty}}{30 + (-20)} = \frac{\text{TotalExpectedPos}}{10}$$

(5) The allocator 410 calculates the ratios according to the allocation rule using the following equations (Equations 65 and 66):

| Broker A portion | + | Broker B portion | + | Broker C portion | = | Total Portions |
|---|---|---|---|---|---|---|
| 2 | + | 2 | + | 1 | = | 5 |

| Portion per Broker | ÷ | Total portions | = | Broker Ratio Portions |
|---|---|---|---|---|
| 2 (Broker A) | ÷ | 5 | = | 40% (Broker A) |
| 2 (Broker B) | ÷ | 5 | = | 40% (Broker B) |
| 1 (Broker B) | ÷ | 5 | = | 20% (Broker C) |

With reference to FIG. 11, instructions (1)-(5) above correspond to block 1106 of FIG. 11.

(6) The allocator 410 calculates the TargetNetPos for each broker using the following equation (Equation 67), which corresponds to block 1108 of FIG. 11:

| TotalExpectedPos | × | Ratio | = | TargetNetPos per broker |
|---|---|---|---|---|
| 10 | × | 40% | = | 4 (Broker A) |
| 10 | × | 40% | = | 4 (Broker B) |
| 10 | × | 20% | = | 2 (Broker C) |

(7) The allocator 410 compares direction of new order to direction of current net position for each broker, which corresponds to block 1110 of FIG. 11. For this example, the buy/sell direction of the new order (negative 20) is opposite of the current net position (positive 30), so the allocator 410 performs the adjustment calculations of blocks 1114-1122 of FIG. 11.

(8) The allocator 410 compares each broker's TargetNetPos with their current net position using the following equation (Equation 68), which corresponds to block 1114 of FIG. 11:

| Current NetPos per broker | < ?> | TargetNetPos | = | Result |
|---|---|---|---|---|
| 9 (Broker A) | < ?> | 4 | = | >; so ok to include Broker A |
| 14 (Broker B) | < ?> | 4 | = | >; so ok to include Broker B |
| 7 (Broker C) | < ?> | 2 | = | >; so ok to include Broker C |

(9) The allocator 410 calculates the preliminary portion qty (pPortionQty) for each broker using the following equation (Equation 69), which corresponds to block 1116 of FIG. 11:

| TotalOrderQty | × | Ratio | = | pPortionQty per broker |
|---|---|---|---|---|
| (−20) | × | 40% | = | (−8) Broker A |
| (−20) | × | 40% | = | (−8) Broker B |
| (−20) | × | 20% | = | (−4) Broker C |

(10) The allocator 410 calculates the preliminary net position (pNetPos) for each broker using the following equation (Equation 70), which corresponds to block 1118 of FIG. 11:

| Current position per broker | + | pPortionQty | = | pNetPos per broker |
|---|---|---|---|---|
| 9 (Broker A) | + | (−8) | = | 1 Broker A |
| 14 (Broker B) | + | (−8) | = | 6 Broker B |
| 7 (Broker C) | + | (−4) | = | 3 Broker C |

(11) The allocator 410 determines the difference of the preliminary net position from the target position using the following equation, (Equation 71) which corresponds to block 1120 of FIG. 11:

| pNetPos per broker | − | TargetNetPos | = | Available adjustment per broker |
|---|---|---|---|---|
| 1 (Broker A) | − | 4 | = | (−3) Broker A |
| 6 (Broker B) | − | 4 | = | 2 Broker B |
| 3 (Broker B) | − | 2 | = | 1 Broker C |

Broker A would exceed its target position by 3, so the (−3) goes into the pool of extra trade orders. Broker B would not exceed its target position, so Broker B goes into the list of available brokers that can receive extra trade orders. Broker C would not exceed its target position, so Broker C goes into the list of available brokers that can receive extra trade orders.

(12) The allocator 410 adjusts the order qty for the brokers that exceeded their pPortionQty using the following equation (Equation 72), which corresponds to block 1120 of FIG. 11. In this example, this list only includes Broker A:

$$\frac{pPortionQty \text{ per broker}}{(-8) \text{ (Broker } A)} - \text{Extra qty} = \frac{\text{Adjusted } PortionQty \text{ per broker}}{(-5) \text{ Broker } C}$$

(13) The allocator 410 allocates the pool of extra trade orders to the list of available brokers that can receive extra trade orders using the following equations (Equations 73 and 74), which corresponds to block 1122 of FIG. 11. In this example, the list includes two available brokers (Broker B and Broker C), so the allocator 410 calculates the sub-ratios:

$$\frac{\text{Broker } B \text{ portion}}{2} + \frac{\text{Broker } C \text{ portion}}{1} = \frac{\text{Total portions for the brokers in the available list}}{3}$$

$$\frac{\text{Portions per Broker}}{2 \text{ (Broker } B) \div} \div \text{Total portions} = \frac{subRatio \text{ per broker}}{66\% \text{ (Broker } B)}$$
$$1 \text{ (Broker } C) \div 3 = 33\% \text{ (Broker } C)$$

The allocator 410 applies the subRatios to allocate the extra contracts using the following equation (Equation 75):

$$\frac{\text{Total extra contracts}}{(-3)} \times subRatio = \frac{\text{Assigned extra qty per broker}}{(-2) \text{ (Broker } B)}$$
$$(-3) \times 33\% = (-1) \text{ (Broker } C)$$

The allocator 410 calculates the adjusted qty for each broker using the following equation (Equation 76):

$$\frac{pPortionQty \text{ per broker}}{(-8) \text{ (Broker } B)} + \text{Extra qty} = \frac{\text{Adjusted } PortionQty \text{ per broker}}{(-10) \text{ Broker } A}$$
$$(-4) \text{ (Broker } C) + (-1) = (-5) \text{ Broker } A$$

(14) The allocator 410 checks the sum of the PortionQty's to ensure that they do not exceed the TotalOrderQty using the following equation (Equation 77), which corresponds to block 1124 of FIG. 11:

| | PortionQty | Compare to | TotalOrderQty | |
|---|---|---|---|---|
| Broker A | (−5) | | | |
| Broker B | (−10) | | | |
| Broker C | (−5) | | | |
| Sum | (−20) | < ? > | (−20) | OK |

In sum, the allocator 410 places a sell order of 5 at Broker A, a second sell order of 10 at Broker B, and a sell order of 5 at Broker C. Assuming both orders completely fill, Joe has reduced his position and has achieved the desired two-two-one split at each broker.

B. Second Example of Multi-Broker Allocation Based on Net Position

Figure 12:
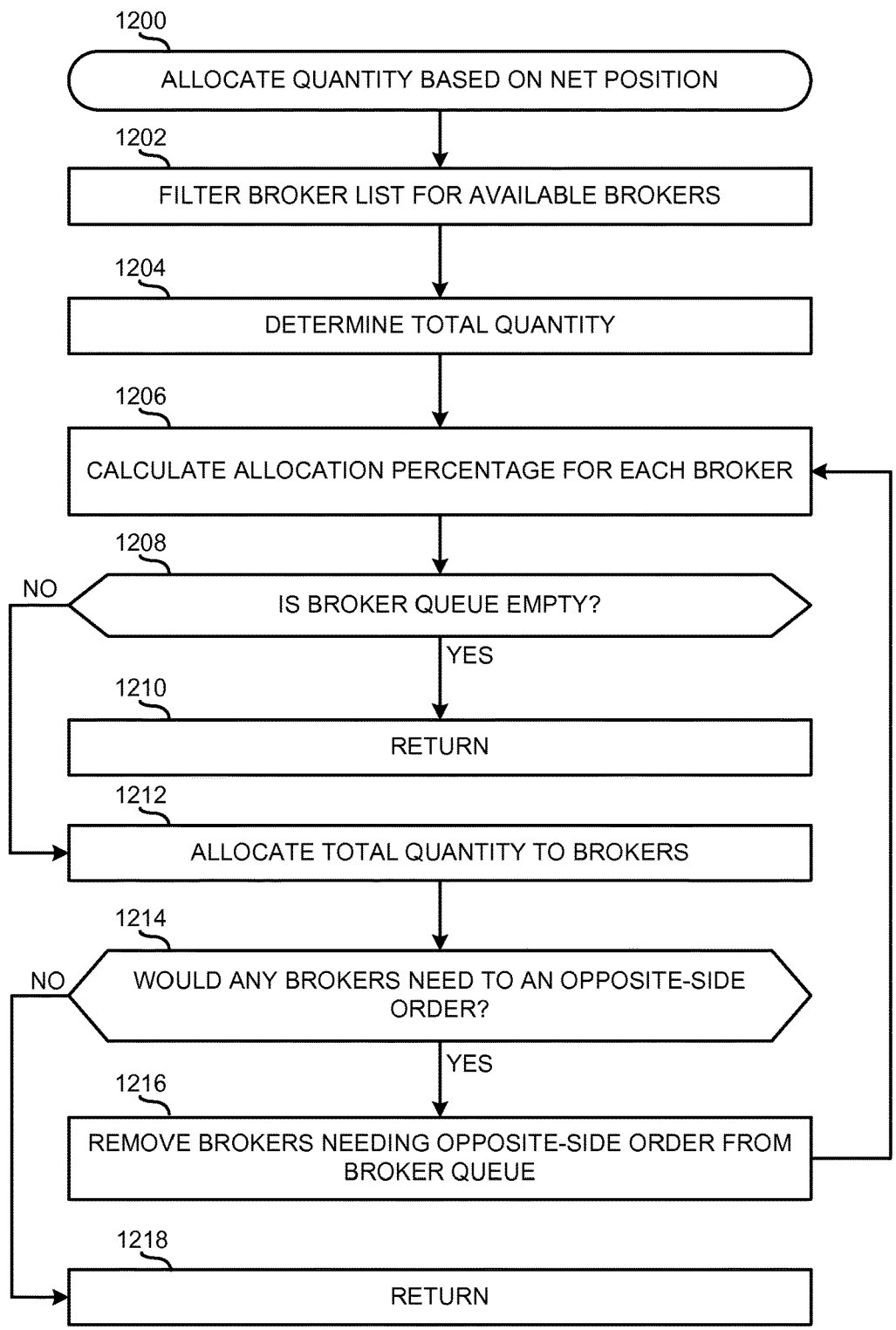
FIG. 12 is a flow diagram illustrative of machine readable instructions that may be executed to implement the example allocator of FIG. 4.
Figure 13:
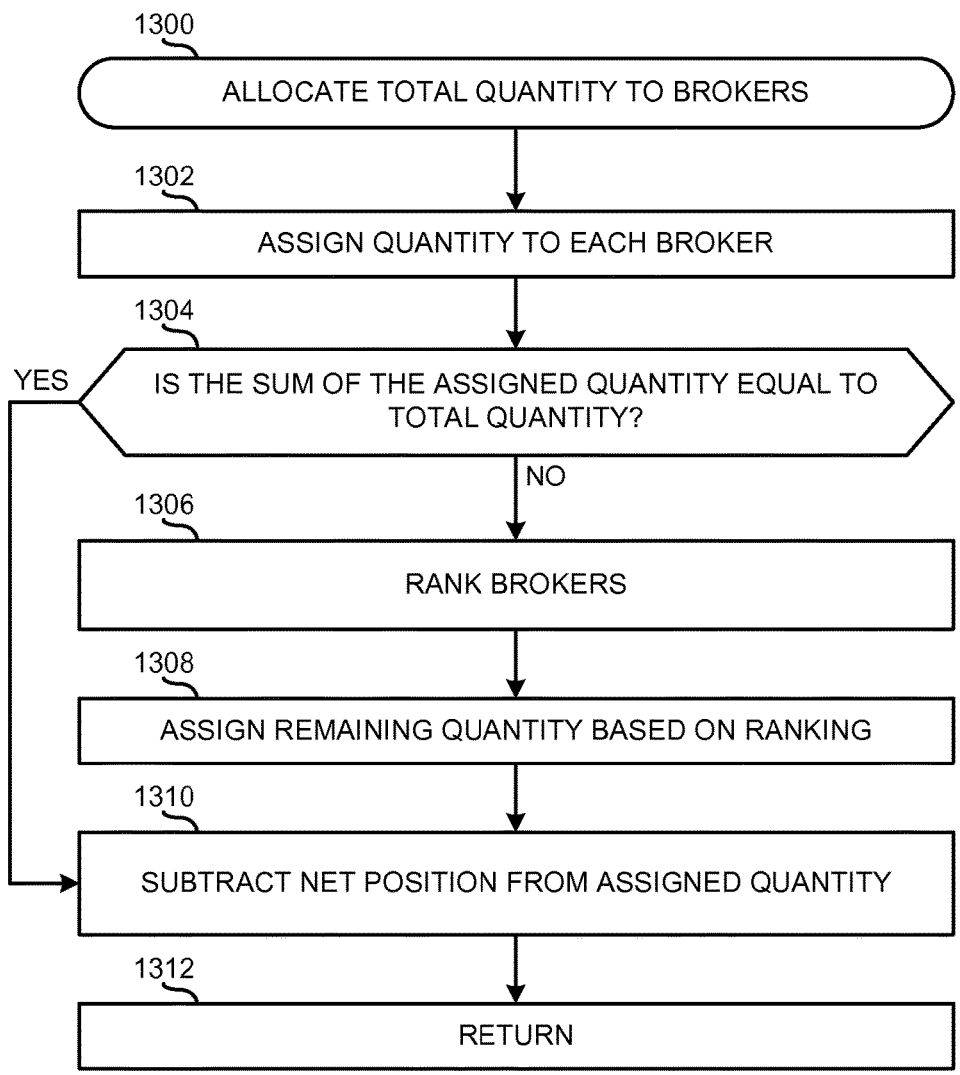
FIG. 13 is a flow diagram illustrative of machine readable instructions that may be executed to implement the example allocator of FIG. 4.

FIGS. 12 and 13 illustrate another example of multi-broker allocation based on net position information associated with the user. FIG. 12 is a flowchart representative of machine readable instructions that may be executed to implement the example allocator 410 of FIG. 3. In the illustrated example, the flowchart of FIG. 12 may be used to implement block 1012 of the example flowchart of FIG. 10. As indicated in FIG. 10, allocation of the trade order is to be based on net position of the user (block 1200).

The example allocator 410 of the multi-broker order router 312 filters a list of brokers to identify available brokers for the trade order based on the buy/sell direction of the order (block 1202). If the order is a buy order, then all "sell" portions are discarded from further consideration on this particular trade order. If the order is a sell order, then all "buy" portions are discarded from further consideration on this particular trade order. Portions designated as "both" remain available. If no available brokers are identified, an error message may be generated.

The allocator 410 then determines a total quantity of the current trade order (block 1204). The total quantity is the sum of the new order quantity and the net positions at the available brokers.

The allocator 410 calculates allocation percentages for each available broker (block 1206). The allocator 410 bases the percentages on the configuration of the selected allocation rule. For example, when the selected allocation rule is a fifty-fifty allocation rule (for example, a rule having a ratio of one to one for a first broker and a second broker, respectively), the allocator 410 calculates fifty percent for each of first and second brokers. Alternatively, when the selected allocation rule is a one-two-one routing rule (for example, a rule having a ratio of one to two to one for first, second and third brokers, respectively) the allocator 410 calculates twenty-five percent for a first broker, fifty percent for a second broker, and twenty-five percent for a third broker.

In the example of FIG. 12, the allocator 410 then determines whether a broker queue is empty (block 1208). The broker queue is a queue of the available brokers identified at block 1202. At the onset, the broker queue includes all of the available brokers. However, the broker queue may be reduced in size (for example, brokers may be removed from the queue) when, for example, one or more of the available brokers would need to use an opposite-side trade order, which is described below. If the broker queue is empty, control returns to FIG. 10 (block 1210). If the broker queue is not empty at block 1208, the allocator 410 allocates the total quantity to the brokers in the broker queue (block 1212). An example implementation of block 1212 is described below in connection with FIG. 13.

The allocator 410 then determines whether any of the brokers would need to use an opposite-side trade order from the side of the new trade order to achieve the allocated quantity (block 1214). For example, assume a user has placed a new trade order to buy a tradeable object. If the user's net position at a first broker is 5 and the allocated quantity for the first broker from block 1212 is 4, then the first broker would need to place a trade order to sell the tradeable object to achieve the allocated quantity. Thus, the first broker would need to use an opposite-side (sell) trade order from the side (buy) of the new trade order. Similarly, if the new trade order was to sell the tradeable object and the allocated quantity for the first broker was 7, then the first broker would need to place a trade order to buy the tradeable object to achieve the allocated quantity, which is an opposite-side (buy) order from the side (sell) of the new trade order. When a broker would need to use an opposite-side trade order from the new trade order, that broker is removed from the broker queue and control returns to block 1206 such that the allocation percentage for each broker is recalculated (block 1216). Otherwise, control returns to FIG. 10 (block 1218).

FIG. 13 is a flowchart representative of machine readable instructions that may be executed to implement the example allocator 410 of FIG. 3. In the illustrated example, the flowchart of FIG. 13 may be used to implement block 1212 of the example flowchart of FIG. 12. As indicated in FIG. 12, the allocator 410 allocates the total quantity to the available brokers (block 1300). In the example of FIG. 13, the allocator 410 assigns each broker a quantity of the trade order to each broker based on the allocation percentage calculated at block 1204 of FIG. 12 (block 1302). To continue the above example, when the allocation rule is a fifty-fifty rule and the allocation percentages are fifty percent each, the total quantity is divided in half. That is, a fifty-fifty rule indicates that each time an order is to be placed, a fifty-fifty distribution between the two brokers is maintained. In other words, the actual total outstanding order quantity is kept split fifty-fifty between the two brokers, at least initially. Such a split sometimes results in a non-whole integer being assigned to brokers. For example, when the trade order quantity is twenty-three, a first broker may be assigned a quantity of eleven and a half (11.5) and the second broker is assigned a quantity of eleven and a half (11.5). The closest whole integer quantity is then assigned to each broker, which in this case is eleven (11).

In the example of FIG. 13, the allocator 410 then determines whether the sum of the assigned quantity is equal to the total quantity (block 1304). Effectively, the allocator 410 is determining whether the initially assigned quantity is equal to the whole integer quantity. If the sum of the assigned quantity is equal to the total quantity, control passes to block 1310, which is described below. Otherwise, if there is remaining quantity the allocator 410 proceeds to block 1306.

At block 1306, the allocator 410 ranks the available brokers. In the certain embodiments, the allocator 410 ranks the brokers according to a user preference. In such instances, the user may select a broker (for example, the first broker) to receive the remaining quantity. In certain embodiments, the allocator 410 ranks the brokers randomly. In certain embodiments, the allocator 410 ranks the brokers according to a pre-defined order. In certain embodiments, the allocator 410 ranks the brokers according to the outstanding order quantity relative to each other. In certain embodiments, the allocator 410 ranks the brokers according to the decimal remaining in the allocated quantity. With reference to the above example, the decimal for both brokers is 0.5 and, as a result, one of the brokers is randomly selected to be ranked ahead of the other. However, in other situations, the first broker may be assigned a quantity of 10.66 and the second broker may be assigned a quantity of 7.33. In such instances, the broker having a higher decimal (in this example, the first broker because 0.66 is higher than 0.33) is ranked first.

The allocator 410 then assigns the remaining quantity to broker(s) based on the ranking (block 1308). In the example above, the remaining quantity of 1 is assigned to the first broker, since the first broker is ranked higher than the second broker based on the decimal of the assigned quantity.

In the example of FIG. 13, the allocator 410 then subtracts the net position of the user at each broker from the quantity assigned to a respective broker to arrive at the portion of the trade order to be allocated to the respective broker (block 1310). Control then returns to the flow chart of FIG. 12 (block 1312).

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example.

The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

The invention claimed is:
1. A method including:
receiving by an order receiver component of a computing device a trade order message for a trade order including a trade order quantity of a tradeable object for a user;
receiving by an allocator component of the computing device from a net position component of the computing device a first net position of the user at a first broker related to the tradeable object;

receiving by the allocator component of the computing device from the net position component of the computing device a second net position of the user at a second broker related to the tradeable object;

calculating by the allocator component of the computing device a total net position of the user related to the tradeable object, wherein the total net position includes the first net position of the user at the first broker related to the tradeable object and the second net position of the user at the second broker related to the tradeable object;

calculating by the allocator component of the computing device a total expected position by adding the total net position to the trade order quantity;

calculating by the allocator component of the computing device a first target net position for the first broker based on a first allocation percentage for the first broker, wherein the first target net position for the first broker is calculated by multiplying the first allocation percentage for the first broker by the total expected position;

calculating by the allocator component of the computing device a second target net position for the second broker based on a second allocation percentage for the second broker, wherein the second target net position for the second broker is calculated by multiplying the second allocation percentage for the second broker by the total expected position;

determining by the allocator component of the computing device an allocation of a first portion of the trade order quantity to the first broker based on the first net position of the user at the first broker related to the tradeable object and the first target net position;

determining by the allocator component of the computing device an allocation of a second portion of the trade order quantity to the second broker based on the second net position of the user at the second broker related to the tradeable object and the second target net position;

sending by a broker communicator component of the computing device a first message to a first broker computing device of the first broker, wherein the first message includes the first portion of the trade order quantity; and sending by the broker communicator component of the computing device a second message to a second broker computing device of the second broker, wherein the second message includes the second portion of the trade order quantity.

2. The method of claim 1, further including:
receiving by a routing rules database of the computing device from a rules generator component of the computing device a routing rule.

3. The method of claim 2, wherein the routing rule specifies the first allocation percentage and the second allocation percentage.

4. The method of claim 2, further including:
calculating by the allocator component of the computing device the first allocation percentage based on the routing rule; and
calculating by the allocator component of the computing device the second allocation percentage based on the routing rule.

5. The method of claim 1, further including:
determining by the allocator component of the computing device whether a direction for the trade order is one of:
(1) the same as a direction of the total net position and
(2) different than the direction of the total net position.

6. The method of claim 5, wherein the allocation of the first portion of the trade order quantity is determined by subtracting the first net position of the user at the first broker related to the tradeable object from the first target net position in response to determining the direction for the trade order is the same as the direction of the total net position.

7. The method of claim 5, wherein the allocation of the second portion of the trade order quantity is determined by subtracting the second net position of the user at the second broker related to the tradeable object from the second target net position in response to determining the direction for the trade order is the same as the direction of the total net position.

8. The method of claim 5, further including, in response to determining the direction for the trade order is different than the direction of the total net position:
calculating by the allocator component of the computing device a first preliminary portion quantity for the first broker based on the trade order quantity and the first allocation percentage;
calculating by the allocator component of the computing device a second preliminary portion quantity for the second broker based on the trade order quantity and the second allocation percentage;
calculating by the allocator component of the computing device a first preliminary net position for the first broker based on the first net position of the user at the first broker related to the tradeable object and the first preliminary portion quantity for the first broker;
calculating by the allocator component of the computing device a second preliminary net position for the second broker based on the second net position of the user at the second broker related to the tradeable object and the second preliminary portion quantity for the second broker;
identifying by the allocator component of the computing device that the first preliminary net position for the first broker does not exceed the first target net position for the first broker;
identifying by the allocator component of the computing device that the second preliminary net position for the second broker exceeds the second target net position for the second broker by an identified excess;
adjusting by the allocator component of the computing device the second preliminary portion quantity for the second broker based on the identified excess; and
adjusting by the allocator component of the computing device the first preliminary portion quantity for the first broker based on the identified excess.

9. The method of claim 8, wherein the allocation of the first portion of the trade order quantity is determined to be the adjusted first preliminary portion quantity for the first broker.

10. The method of claim 8, wherein the allocation of the second portion of the trade order quantity is determined to be the adjusted second preliminary portion quantity for the second broker.

11. The method of claim 1, further including:
checking by the allocator component of the computing device that a sum of the first portion of the trade order quantity and the second portion of the trade order quantity is not greater than the trade order quantity.

12. The method of claim 1, wherein the first message is a first trade order, wherein the second message is a second trade order.

\* \* \* \* \*